(12) United States Patent
Lee et al.

(10) Patent No.: US 12,436,429 B2
(45) Date of Patent: Oct. 7, 2025

(54) DISPLAY DEVICE

(71) Applicant: LG ELECTRONICS INC., Seoul (KR)

(72) Inventors: Keunsoo Lee, Seoul (KR); Wanggun Lee, Seoul (KR); Hoyoung Seo, Seoul (KR); Jeoungoun Lee, Seoul (KR); Heajung Park, Seoul (KR); Sehoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/844,494

(22) PCT Filed: Sep. 16, 2022

(86) PCT No.: PCT/KR2022/013861
§ 371 (c)(1),
(2) Date: Sep. 6, 2024

(87) PCT Pub. No.: WO2023/171865
PCT Pub. Date: Sep. 14, 2023

(65) Prior Publication Data
US 2025/0180951 A1    Jun. 5, 2025

(30) Foreign Application Priority Data

Mar. 7, 2022 (KR) .................. 10-2022-0029011
Mar. 7, 2022 (KR) .................. 10-2022-0029012

(51) Int. Cl.
*G02F 1/00* (2006.01)
*G02F 1/1335* (2006.01)
(Continued)

(52) U.S. Cl.
CPC .. *G02F 1/133614* (2021.01); *G02F 1/133603* (2013.01); *G02F 1/133621* (2013.01); *H10H 29/24* (2025.01)

(58) Field of Classification Search
None
See application file for complete search history.

(56) References Cited

U.S. PATENT DOCUMENTS 10,185,079 B2 * 1/2019 Yoon .................... G02B 6/0085
12,282,216 B2 * 4/2025 Xu ....................... G02F 1/13336
(Continued)

FOREIGN PATENT DOCUMENTS

| JP | 2015-015105 | 1/2015 |
|----|-------------|--------|
| JP | 6554594 | 7/2019 |
| KR | 10-2016-0095568 | 8/2016 |

OTHER PUBLICATIONS

PCT International Application No. PCT/KR2022/013861, International Search Report dated Jan. 10, 2023, 4 pages.
(Continued)

*Primary Examiner* — Gerald J Sufleta, II
(74) *Attorney, Agent, or Firm* — LEE, HONG, DEGERMAN, KANG & WAIMEY

(57) ABSTRACT

Disclosed is a display device. The display device of the present disclosure may include: a display panel; an optical assembly providing light to the display panel; a light absorbing layer which is located on an optical path provided from the optical assembly to the display panel and which absorbs light of a certain range of wavelengths; an optical plate opposite the display panel, with respect to the light absorbing layer; and a first pad which is located at the front surface of the light absorbing layer adjacent to the edge of the light absorbing layer, and including a fluorescent layer, wherein white light may be incident to the display panel.

14 Claims, 37 Drawing Sheets

(51) Int. Cl.
*G02F 1/13357* (2006.01)
*H10H 29/24* (2025.01)

(56) References Cited

U.S. PATENT DOCUMENTS

| | | |
|---|---|---|
| 2010/0271807 A1 | 10/2010 | Chiu et al. |
| 2012/0182762 A1 | 7/2012 | Hu et al. |
| 2014/0319995 A1 | 10/2014 | Kim et al. |
| 2015/0009454 A1 | 1/2015 | Nagatani et al. |
| 2016/0223739 A1 | 8/2016 | Yoon et al. |
| 2018/0039006 A1 | 2/2018 | Gotou |
| 2018/0045874 A1 | 2/2018 | Matsui et al. |
| 2020/0166696 A1* | 5/2020 | Park .................... G02B 6/0055 |
| 2020/0348560 A1 | 11/2020 | Yi et al. |

OTHER PUBLICATIONS

European Patent Office Application Serial No. 22931112.1, Search Report dated Jun. 4, 2025, 14 pages.

* cited by examiner

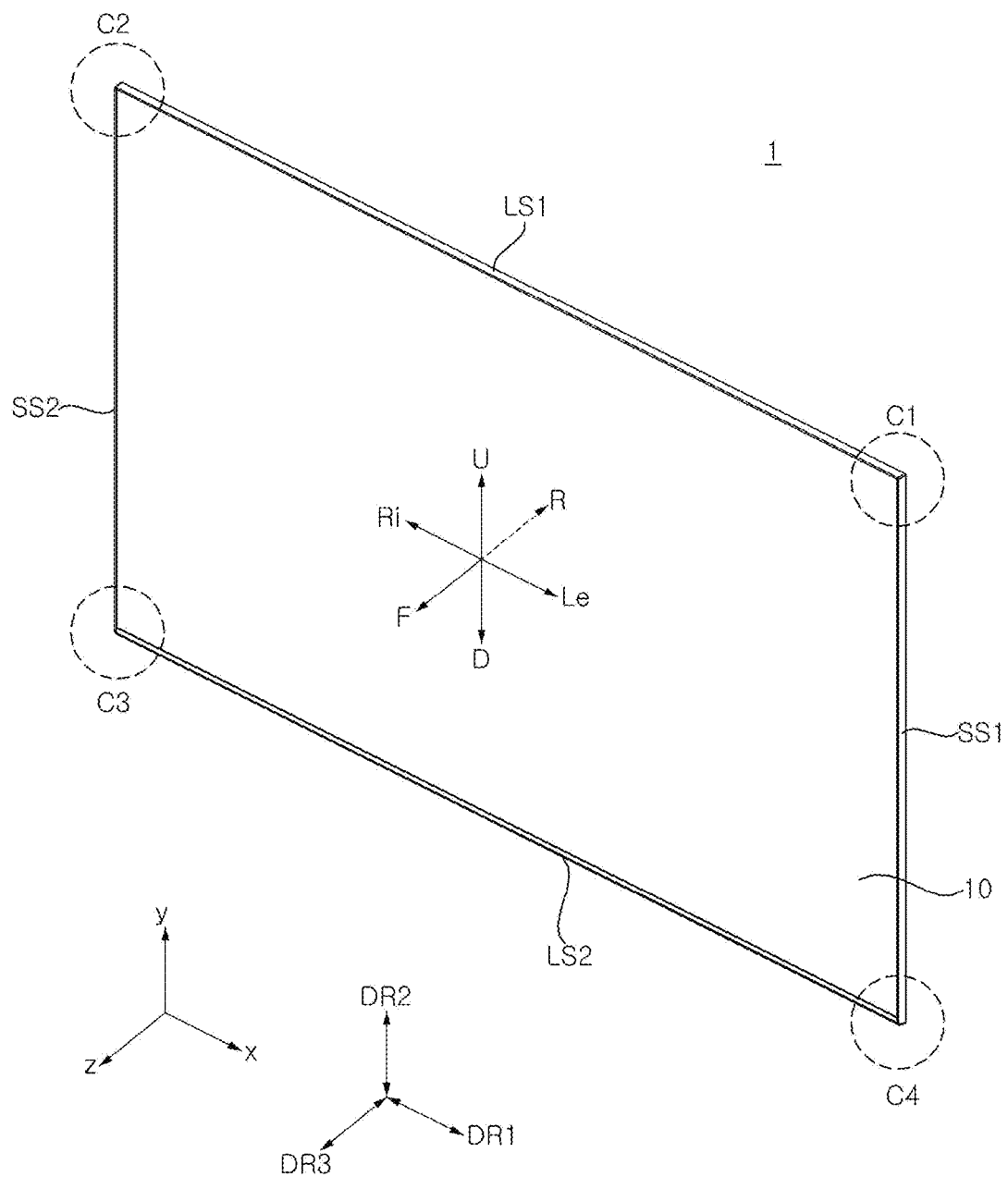
[FIG. 1]

[FIG. 2]
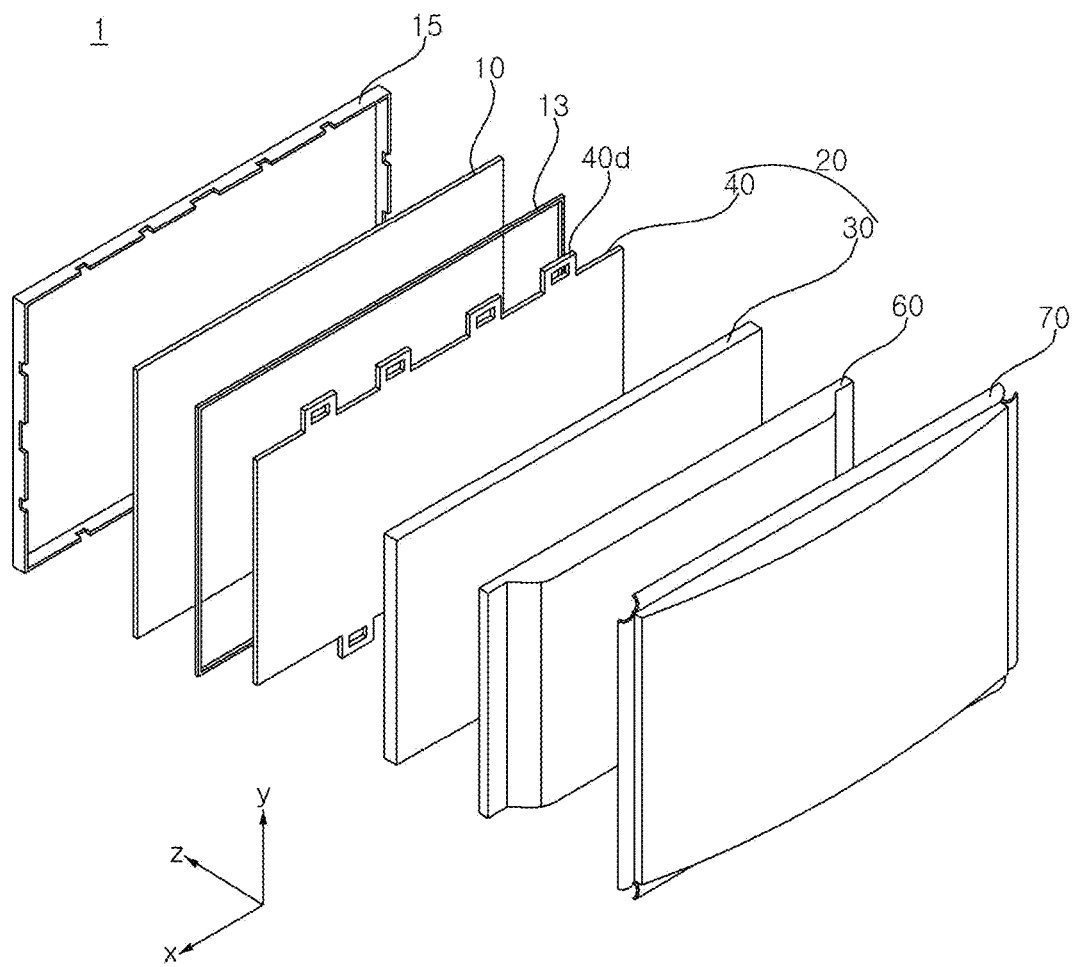

[FIG. 3]
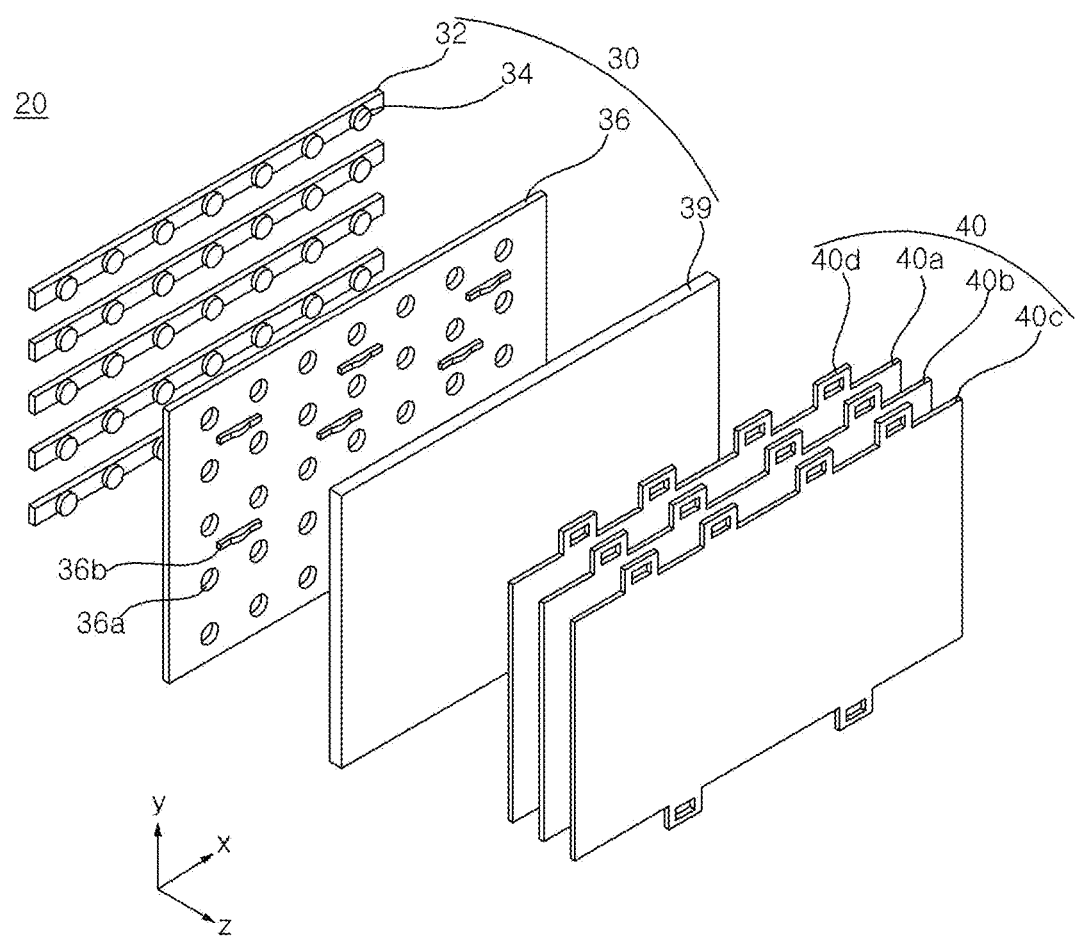

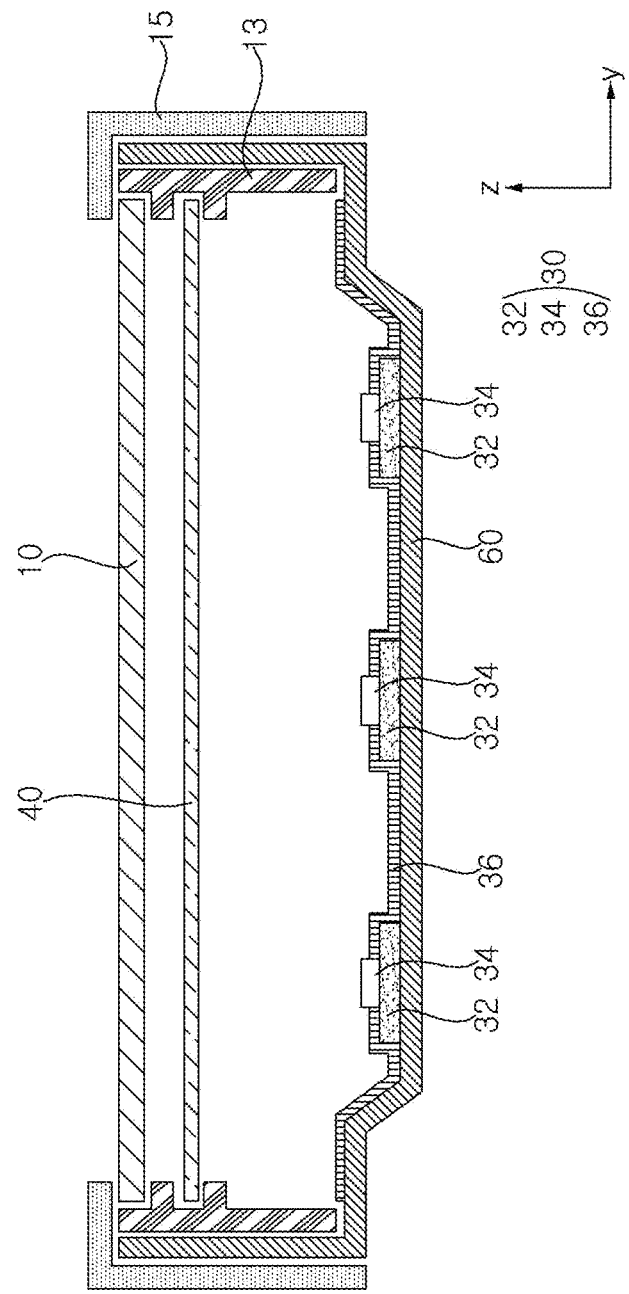
[FIG. 4]

[FIG. 5]
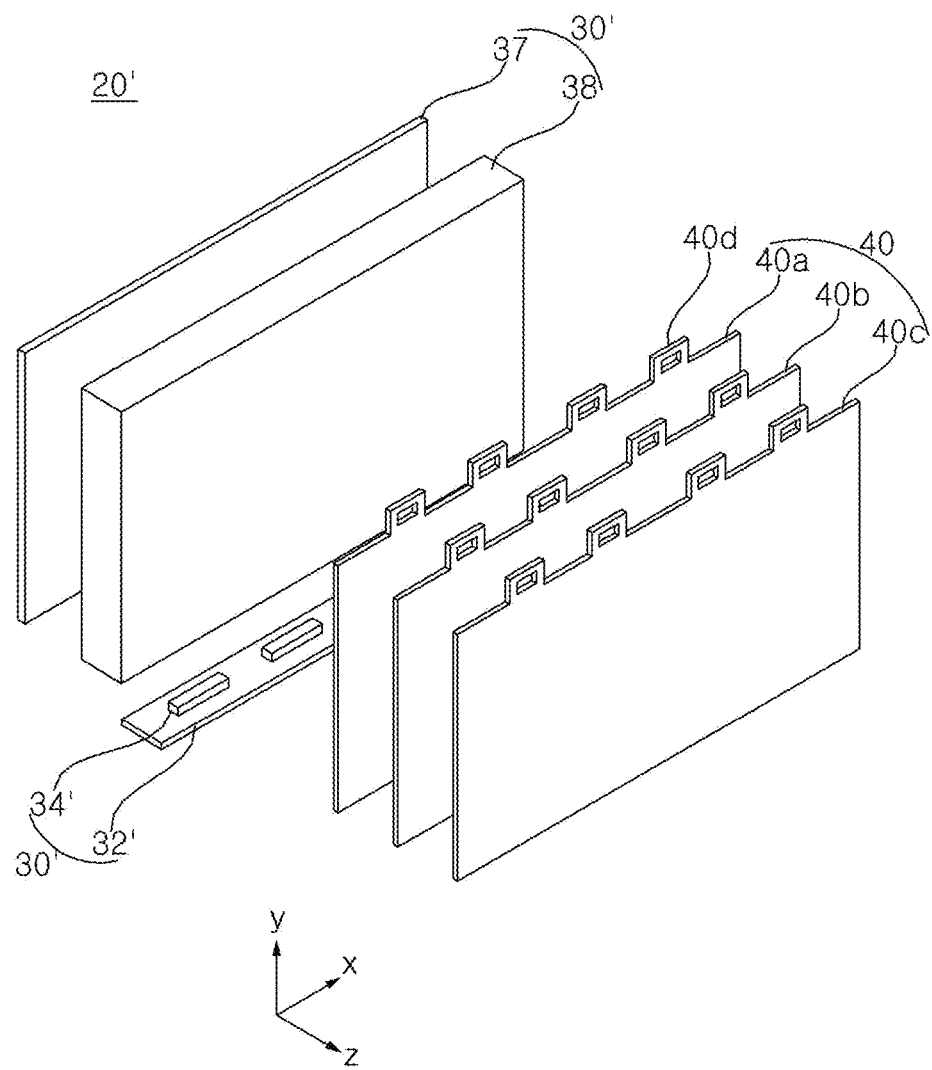

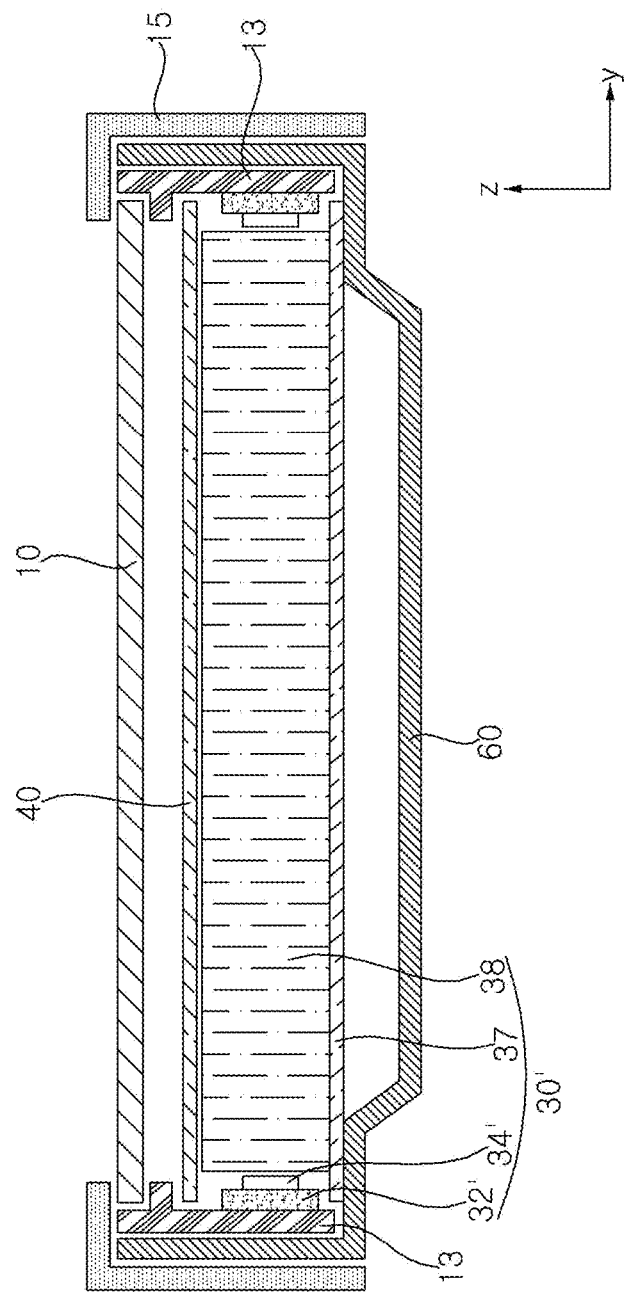
[FIG. 6]

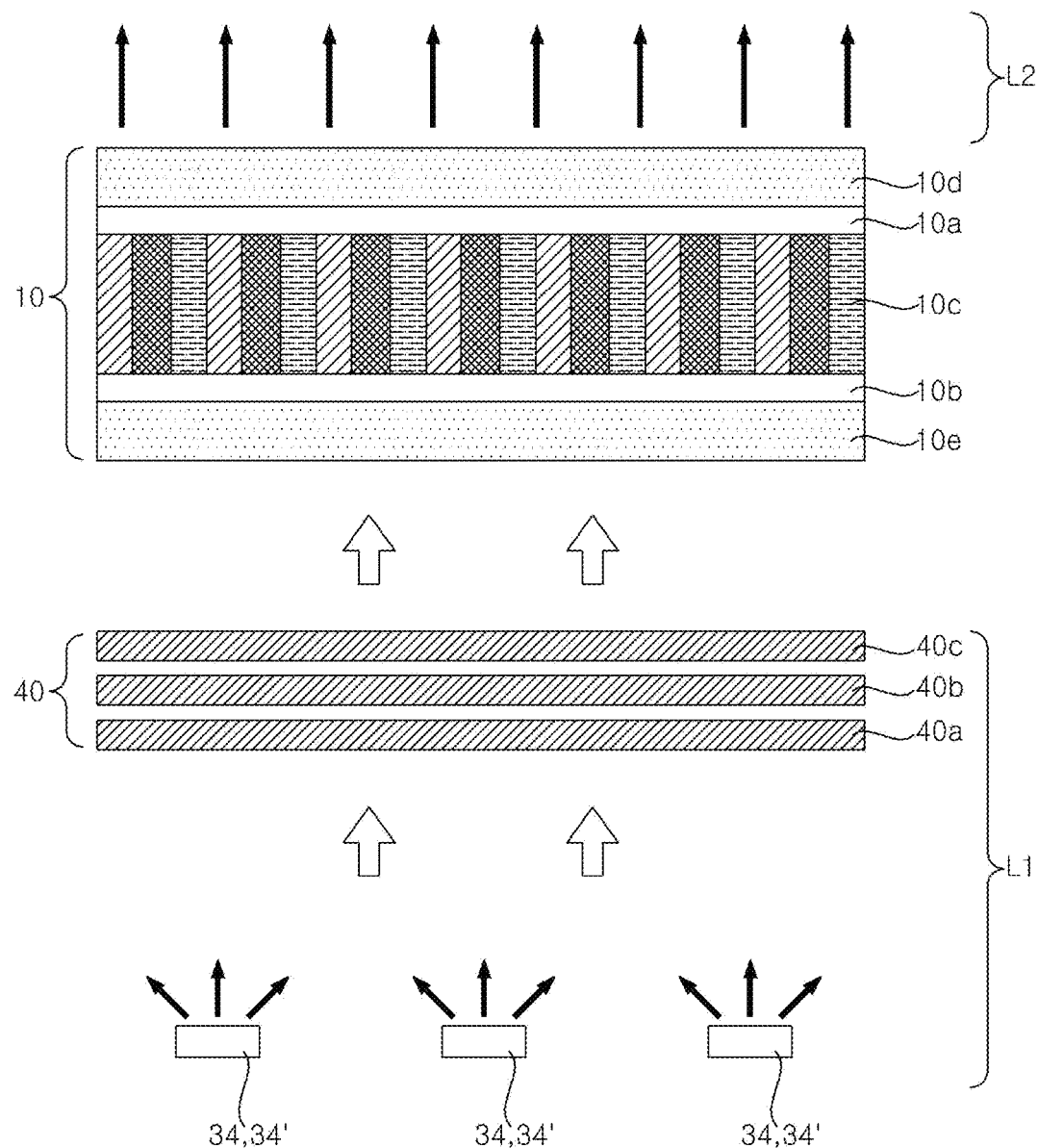
[FIG. 7]

[FIG. 8]
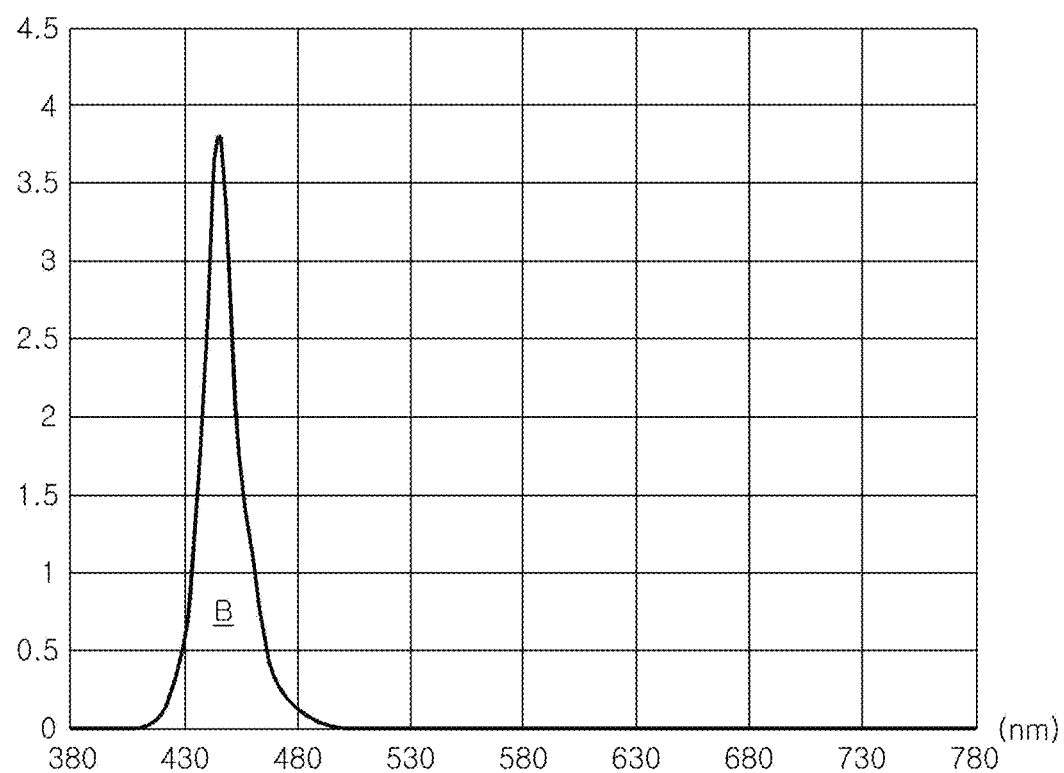

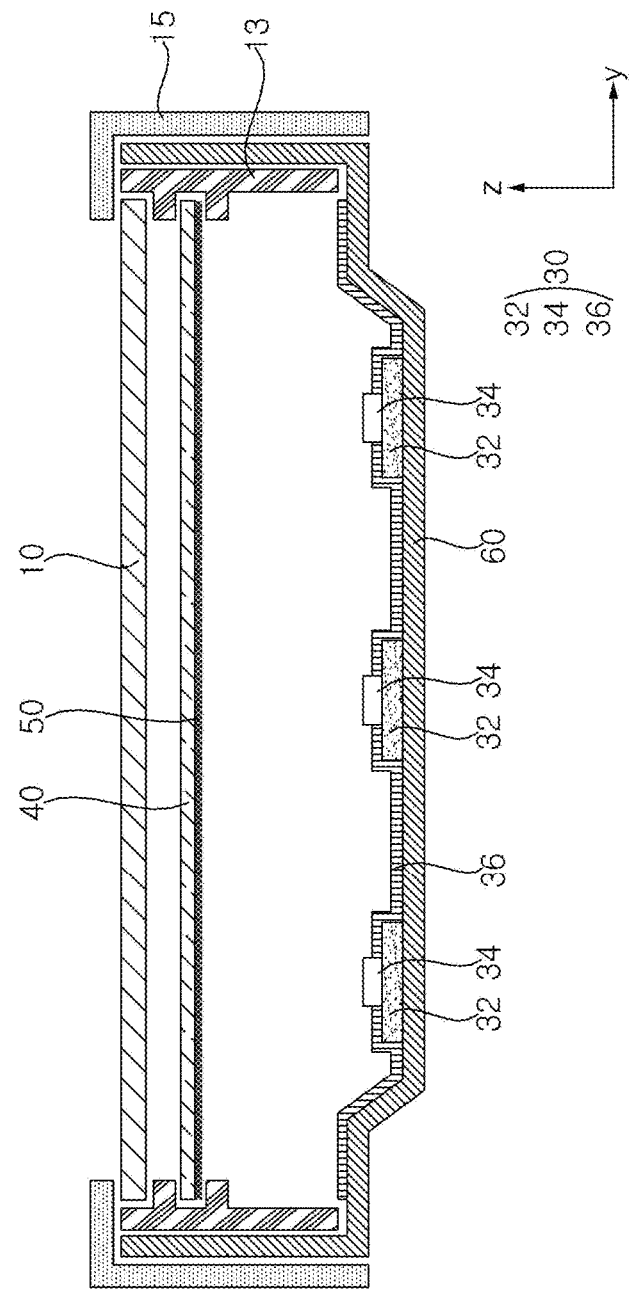
[FIG. 9]

[FIG. 10]
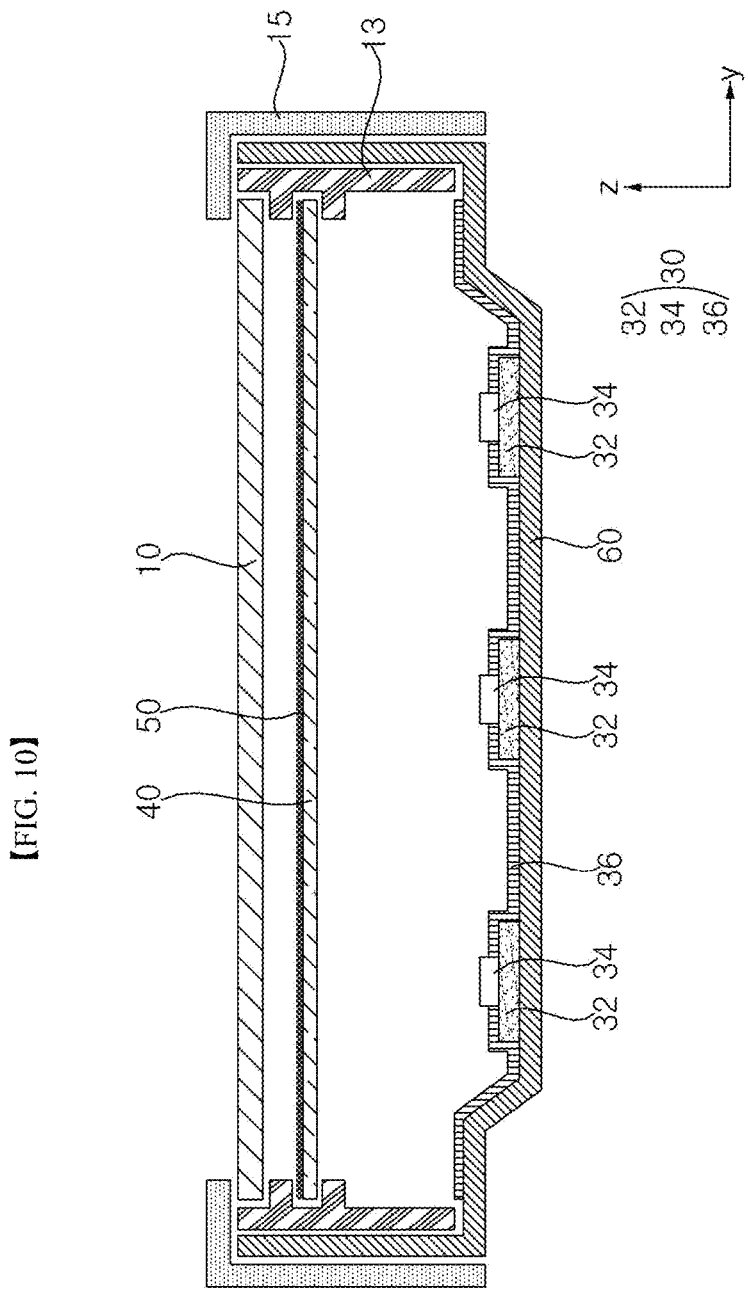

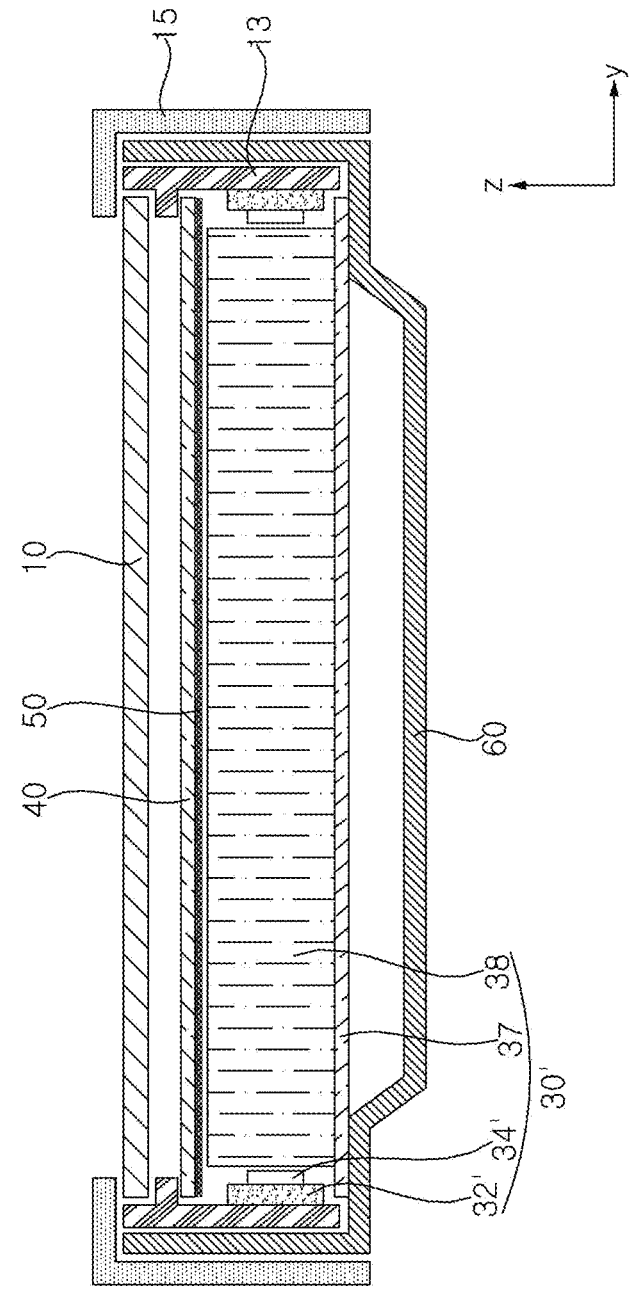
[FIG. 11]

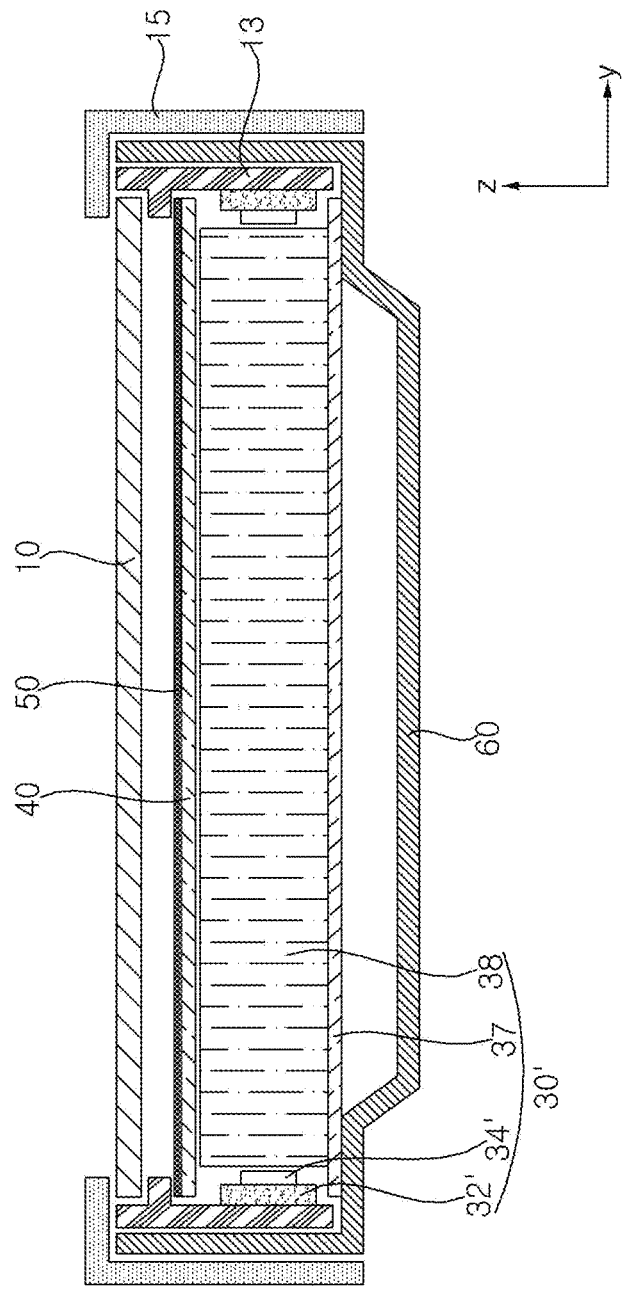
[FIG. 12]

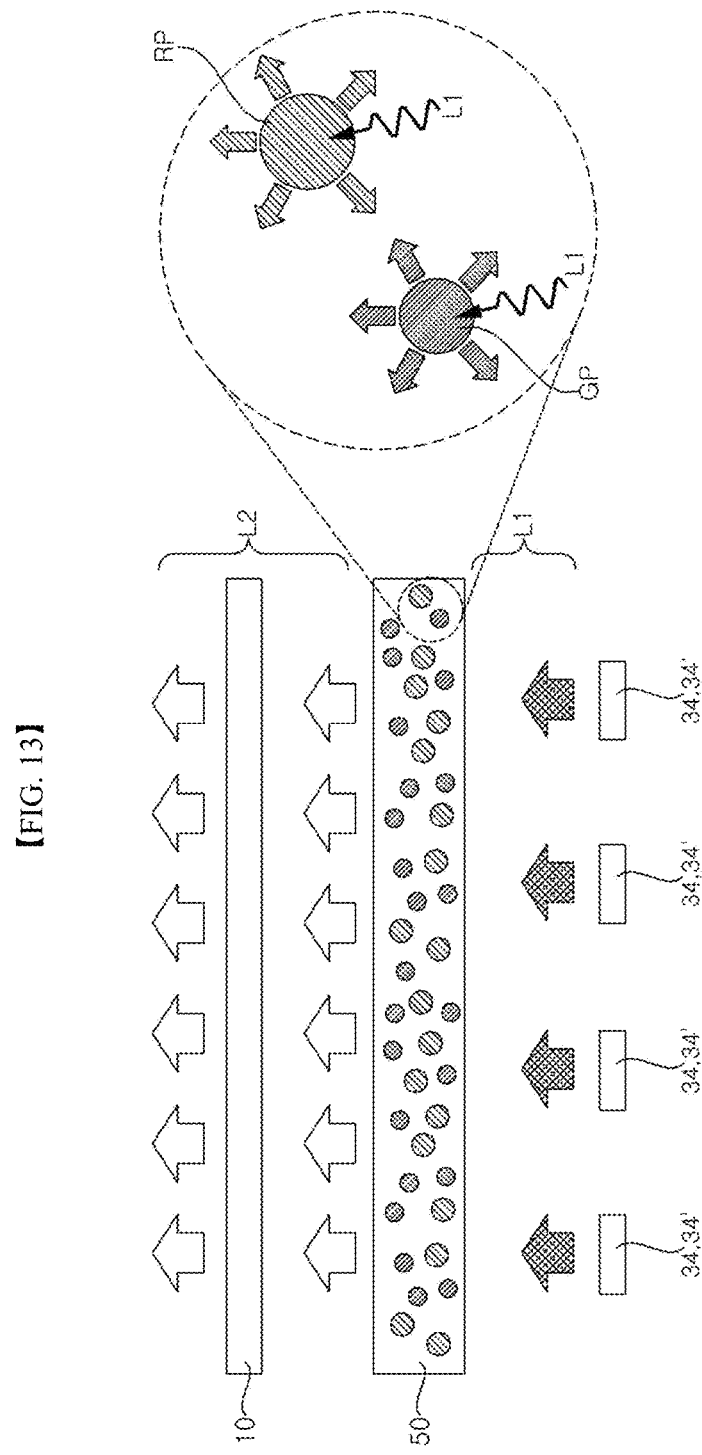

[FIG. 14]
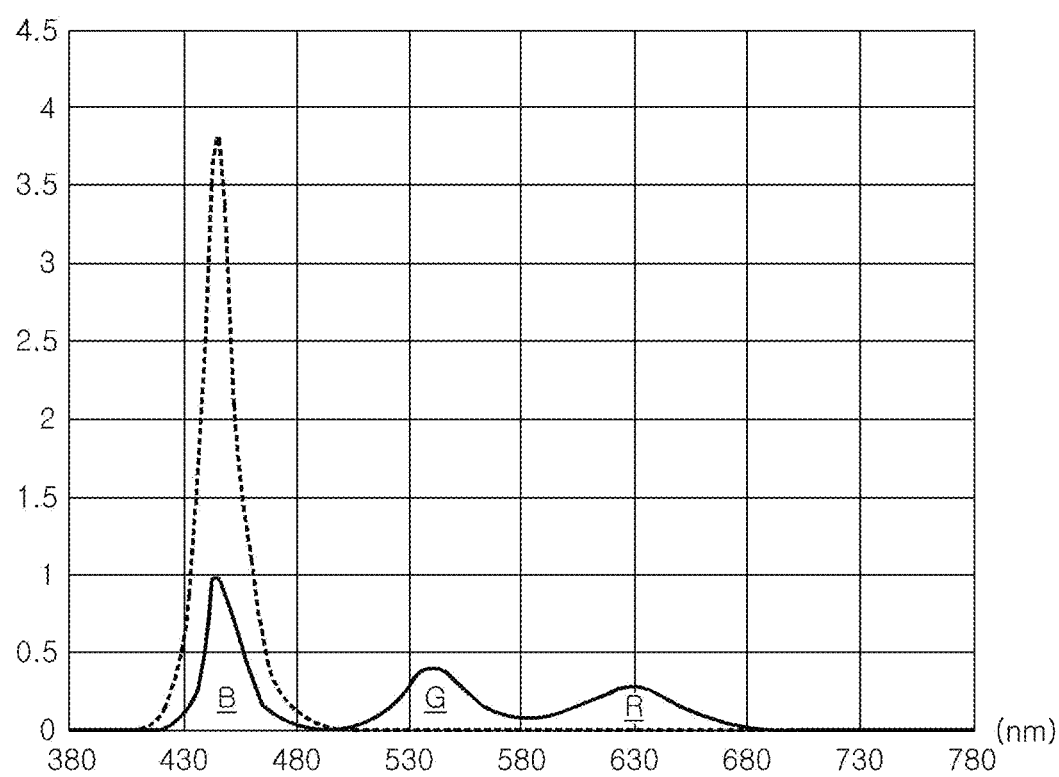

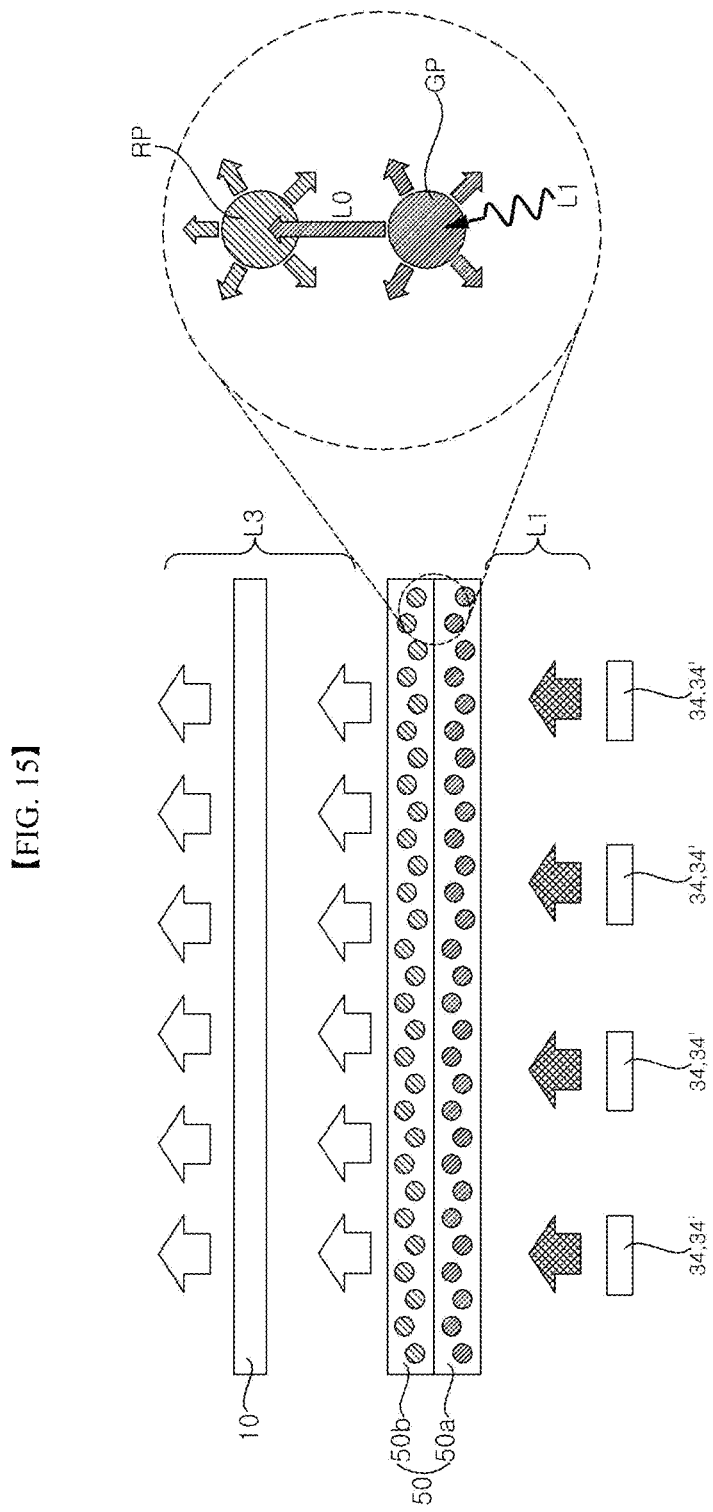
[FIG. 15]

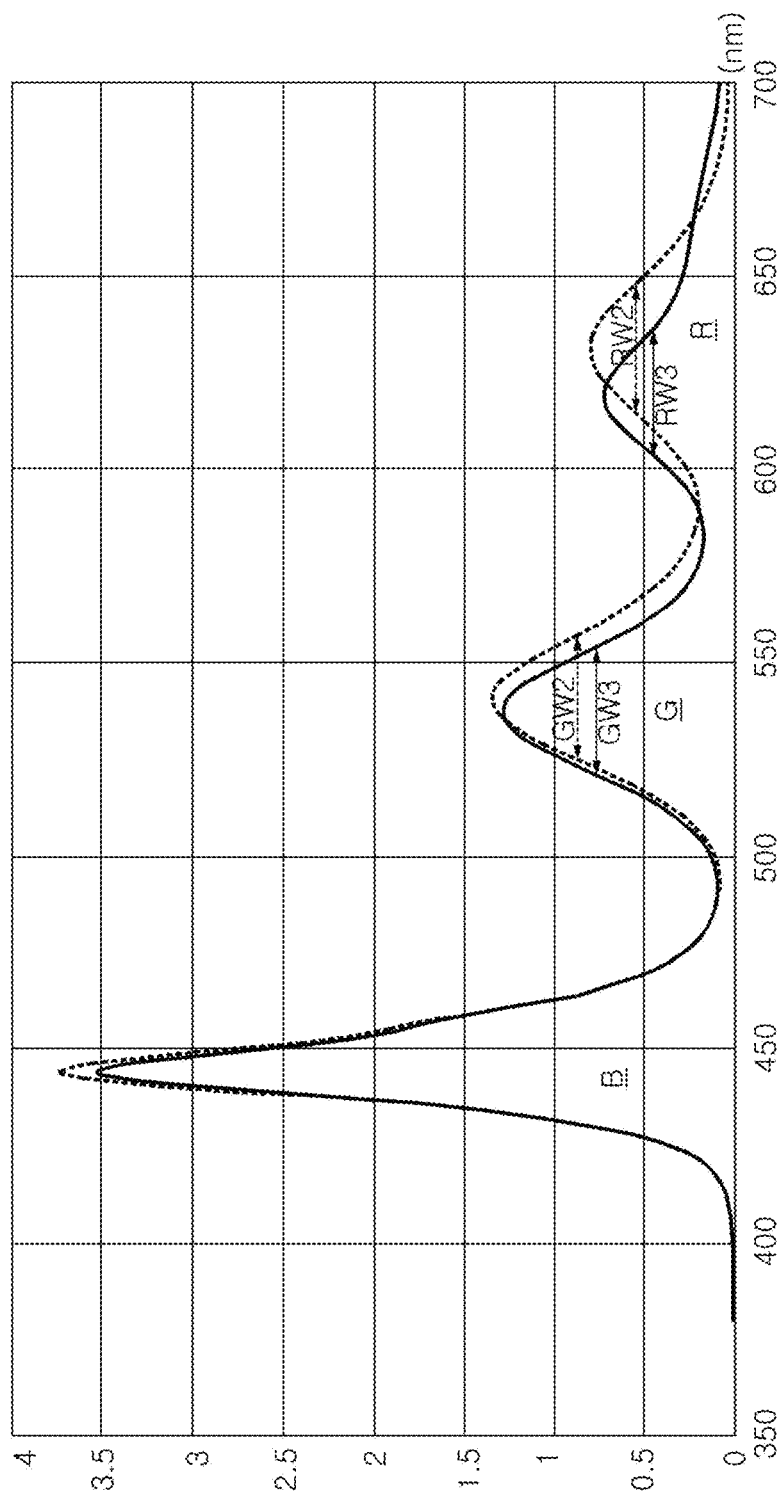
[FIG. 16]

[FIG. 17]
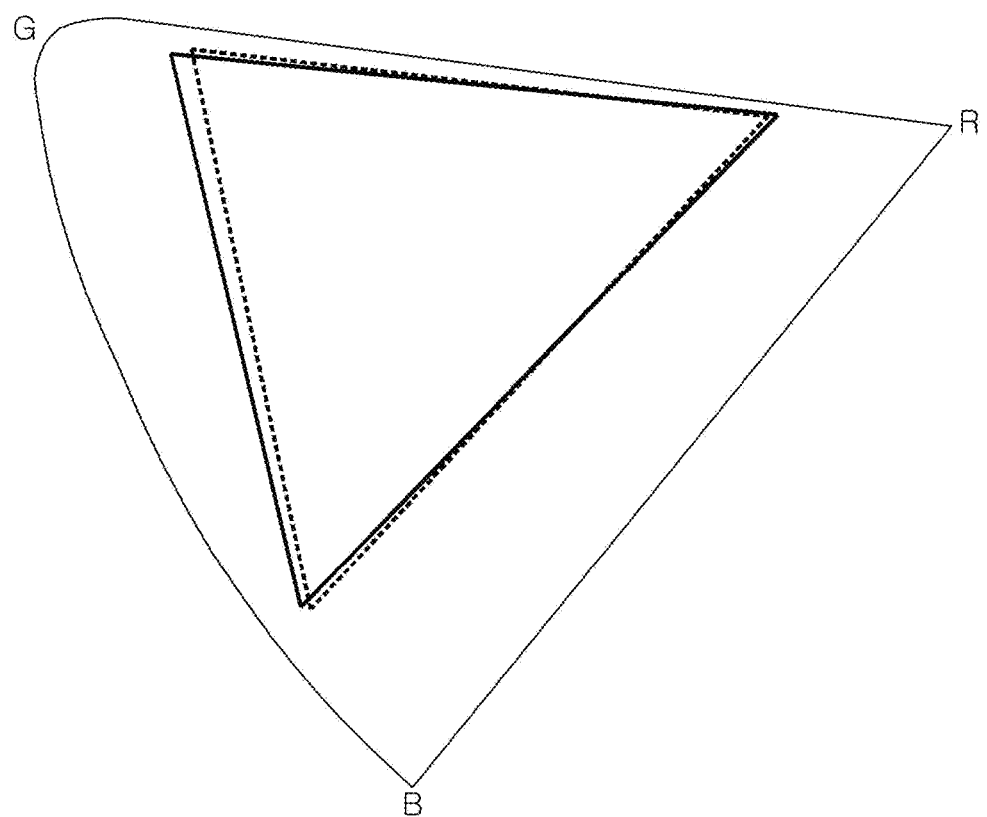

[FIG. 18]
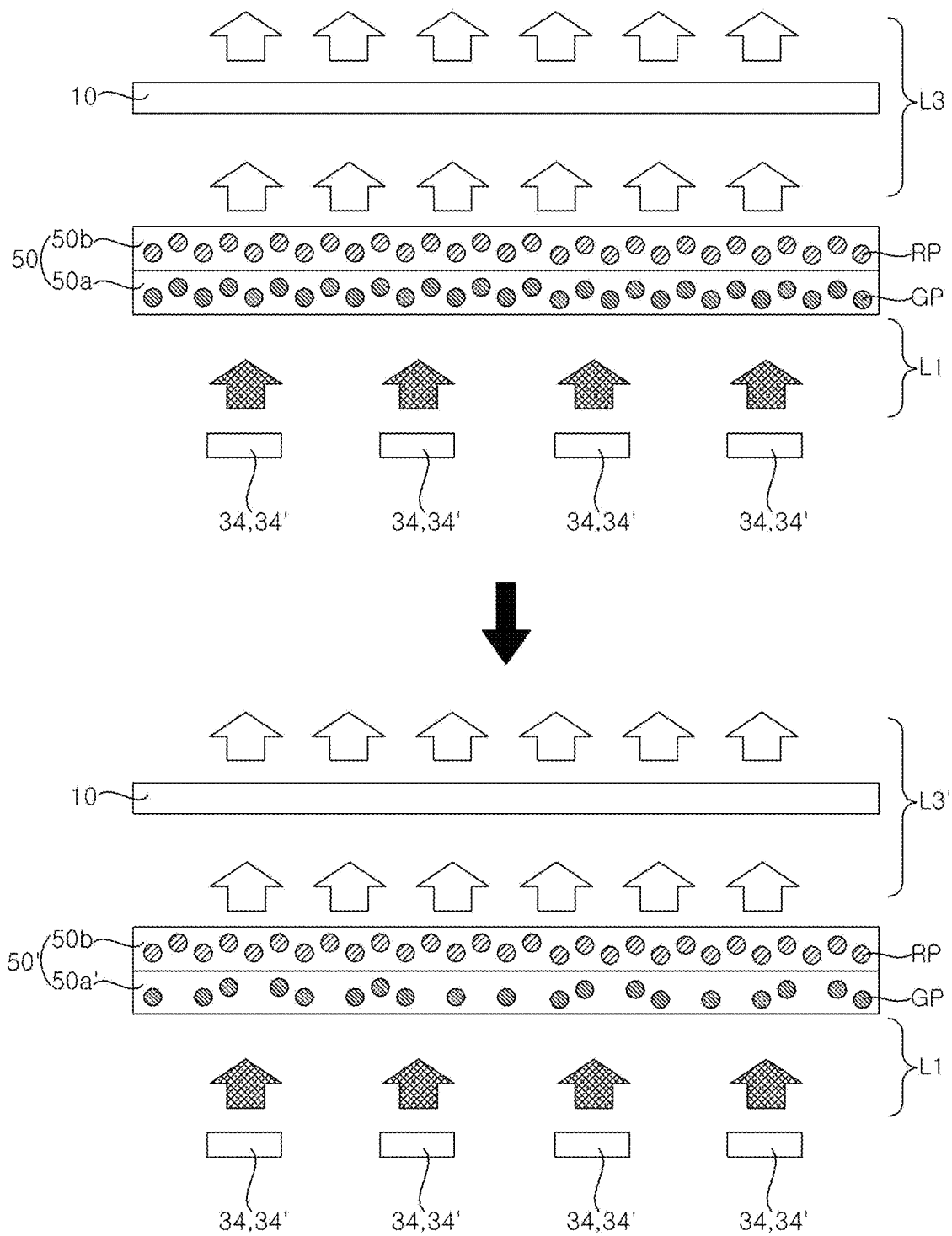

[FIG. 19]
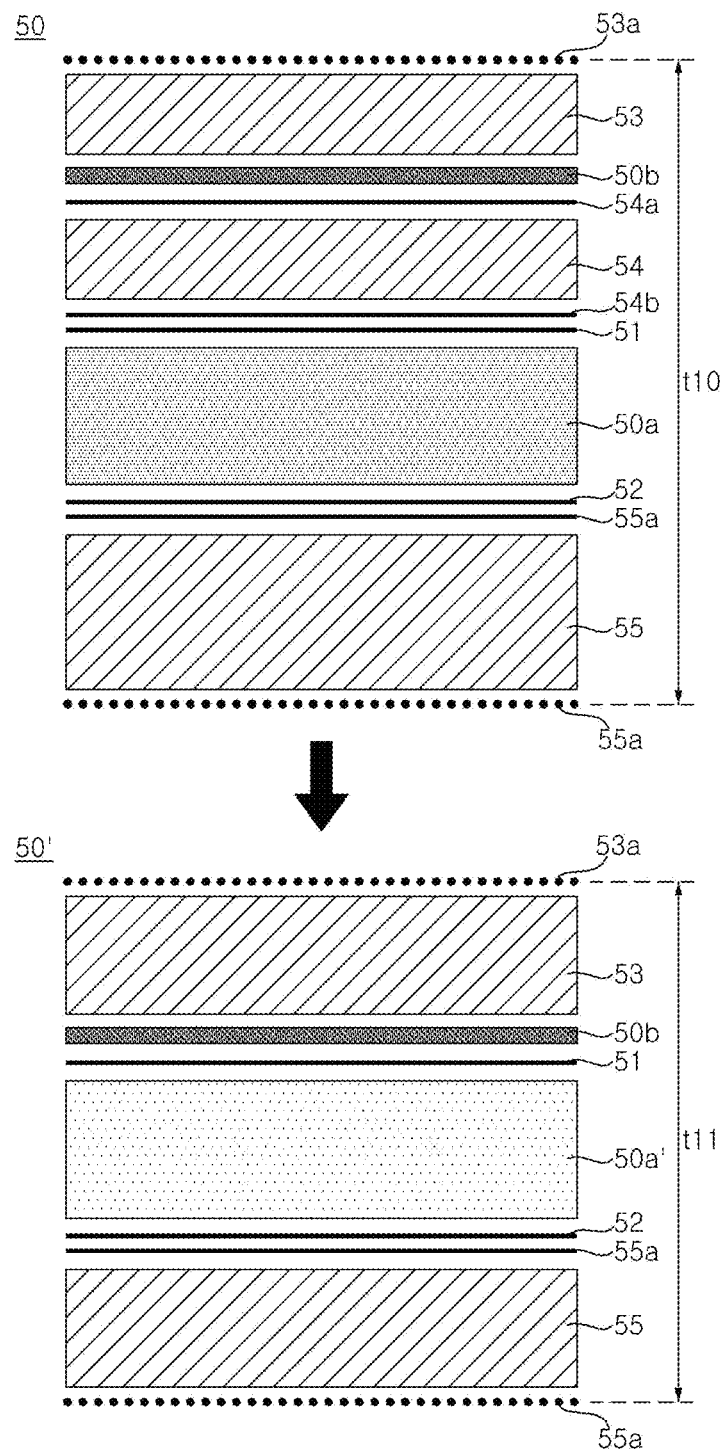

[FIG. 20]
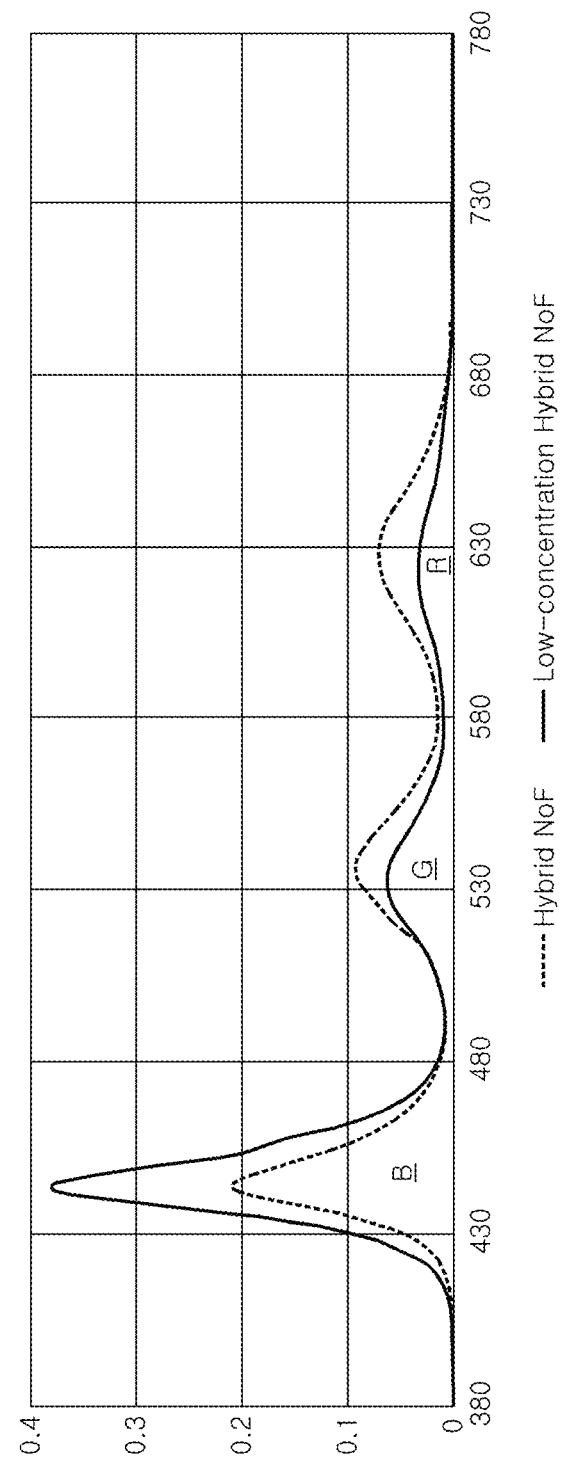

[FIG. 21]
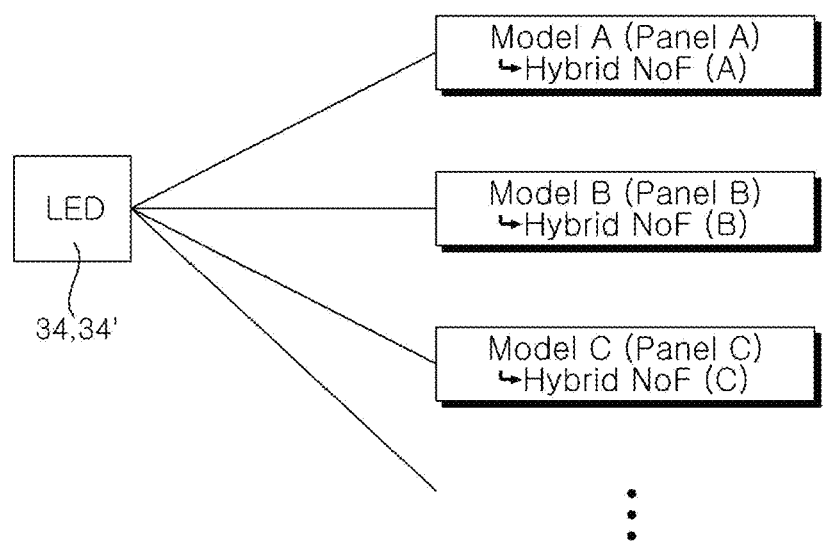

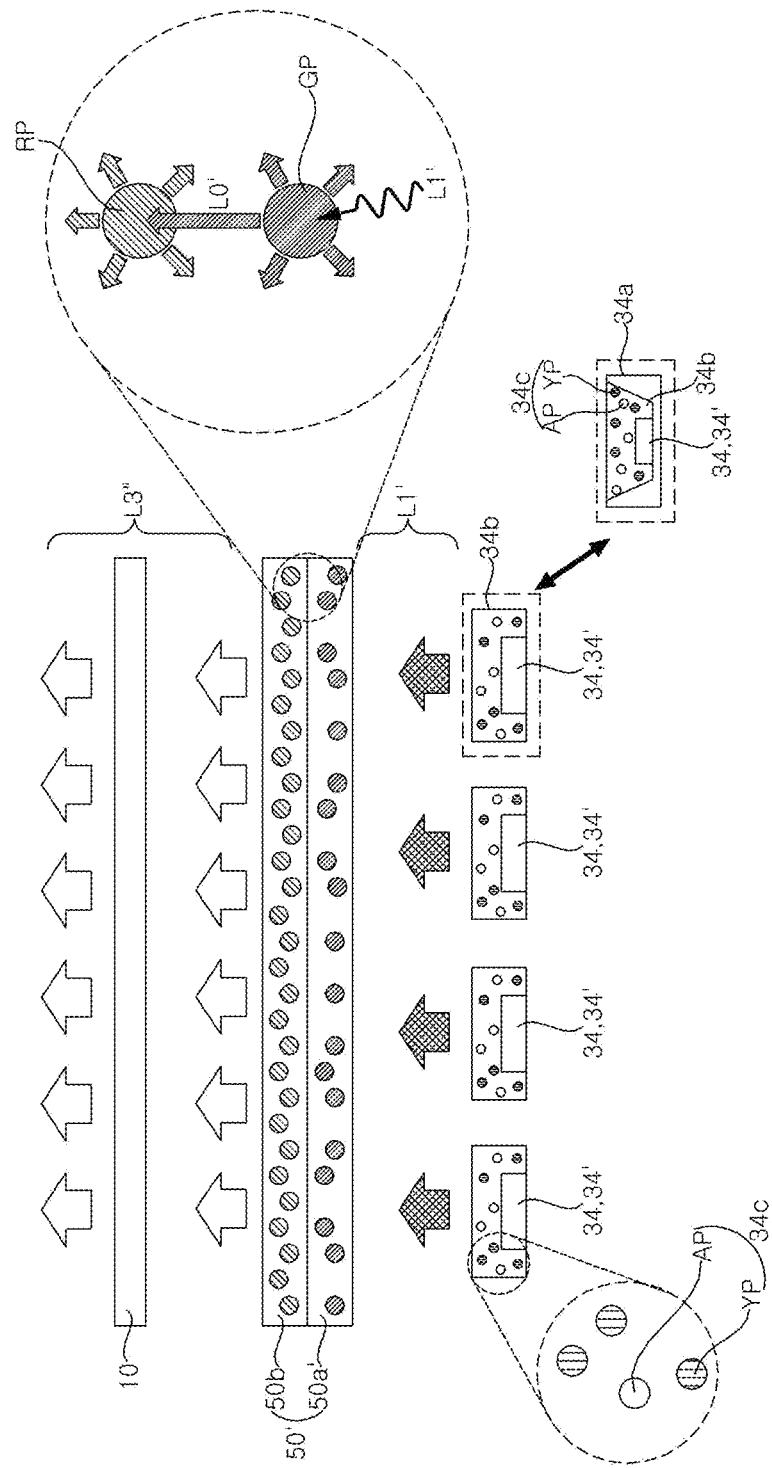
[FIG. 22]

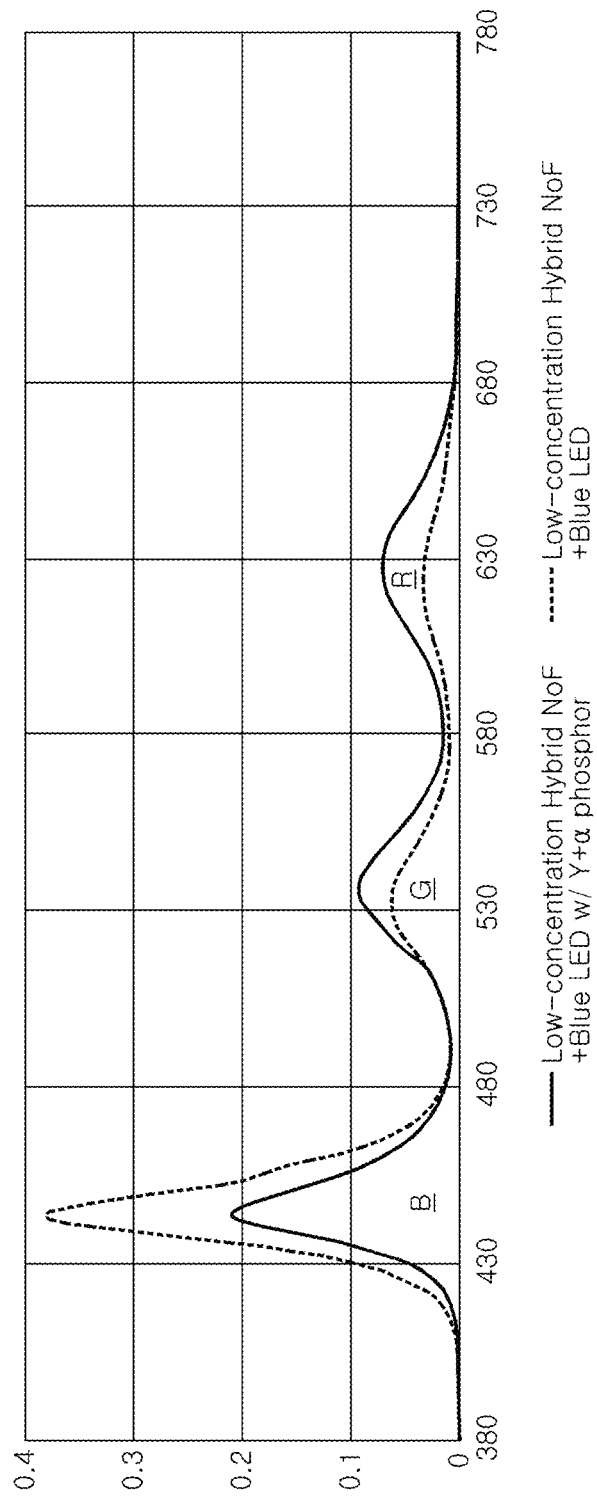
[FIG. 23]

[FIG. 24]
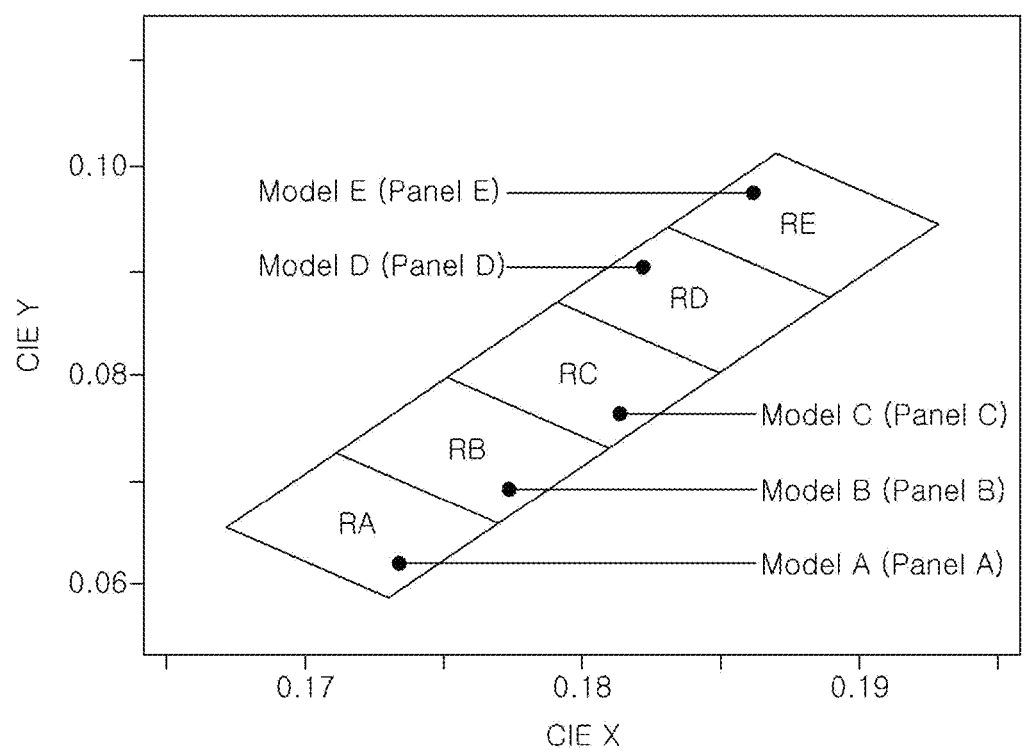

[FIG. 25]
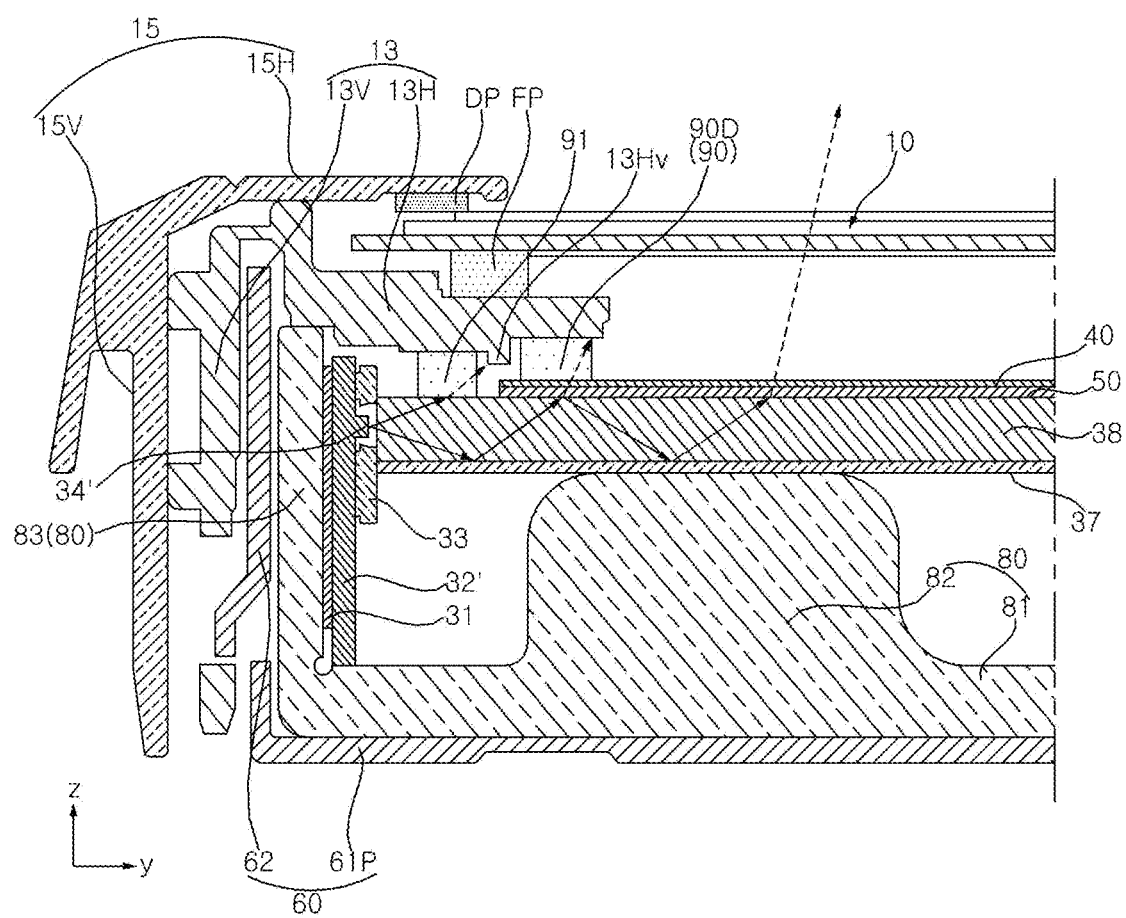

[FIG. 26]
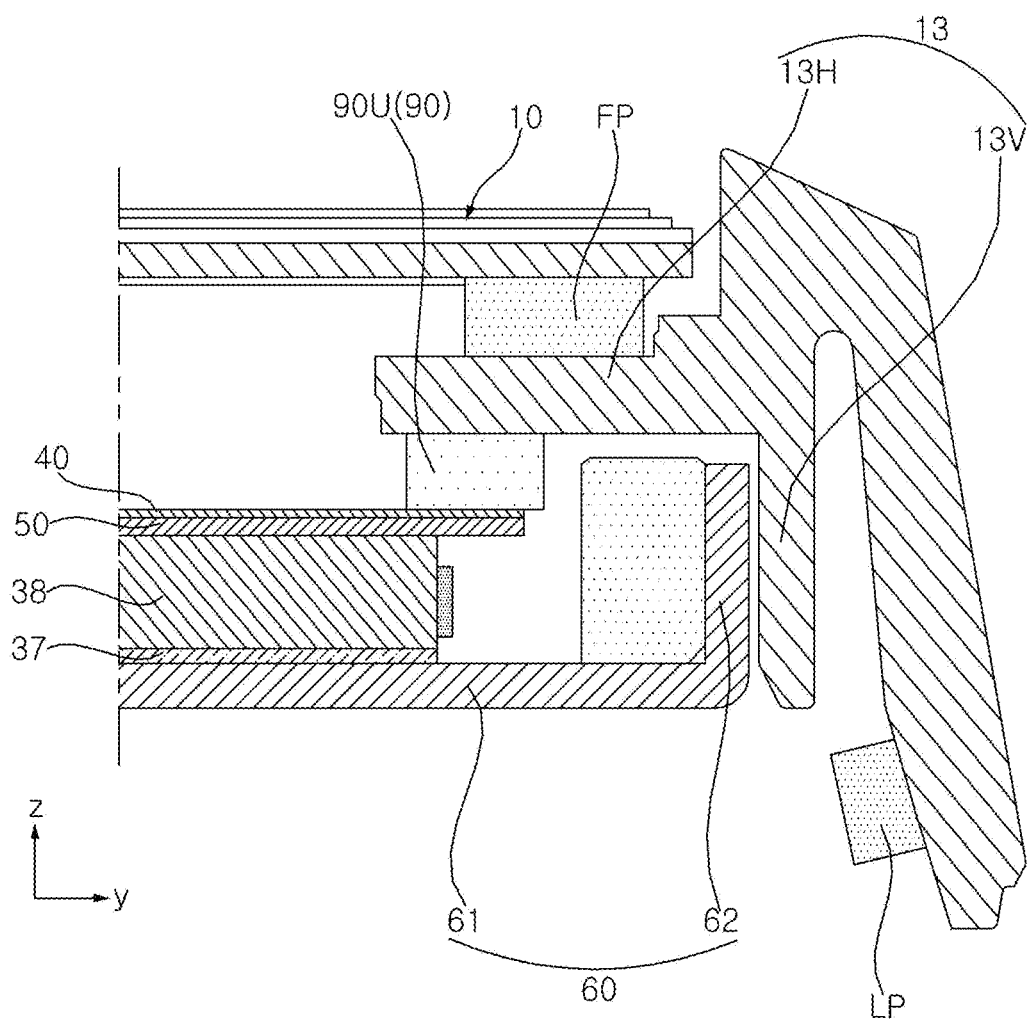

[FIG. 27]
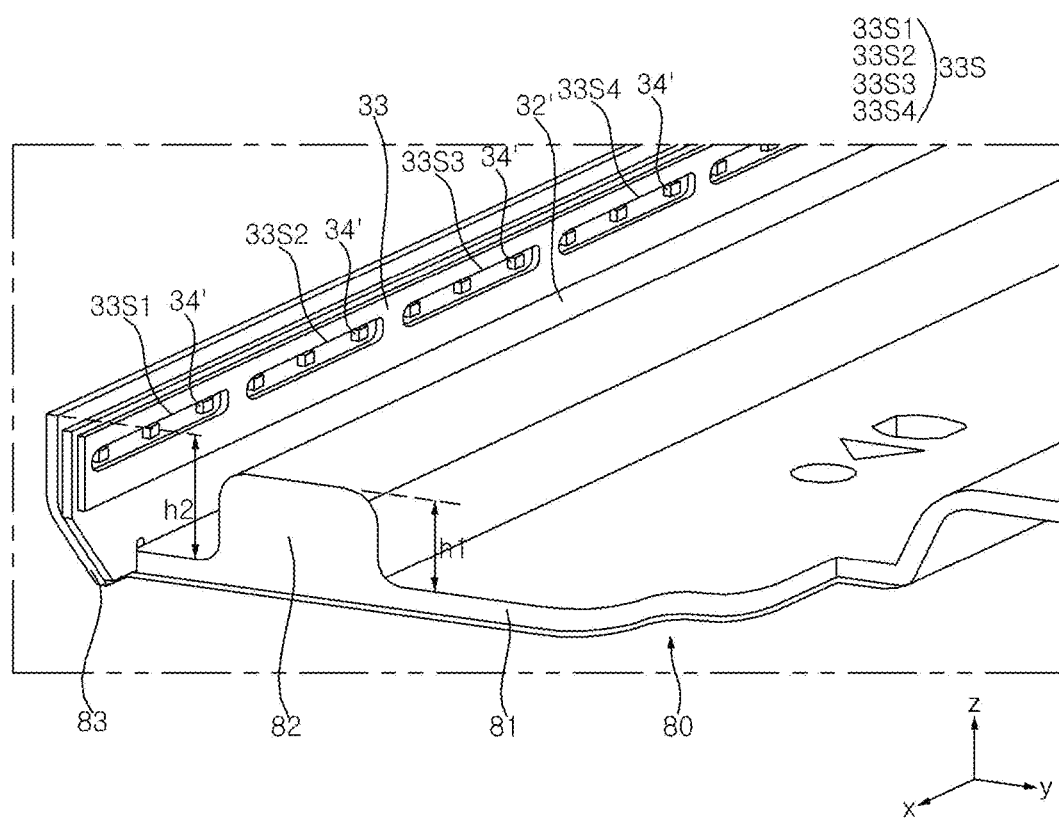

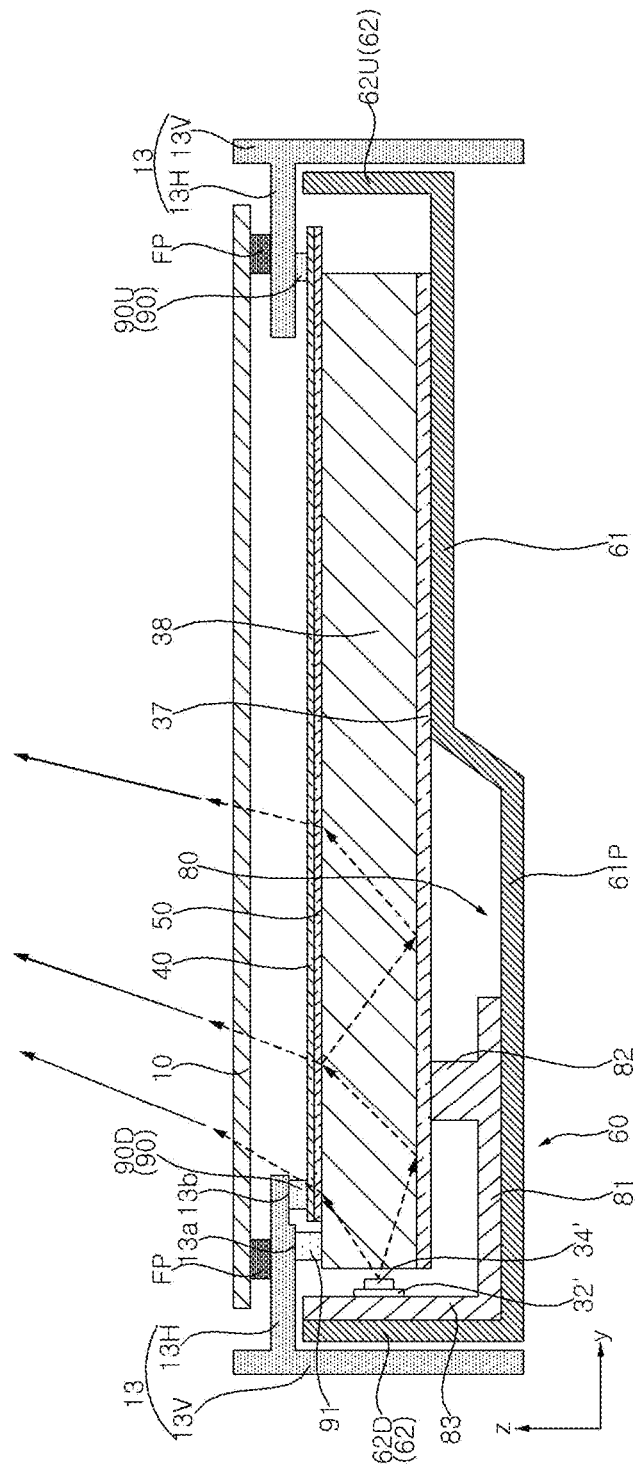
[FIG. 28]

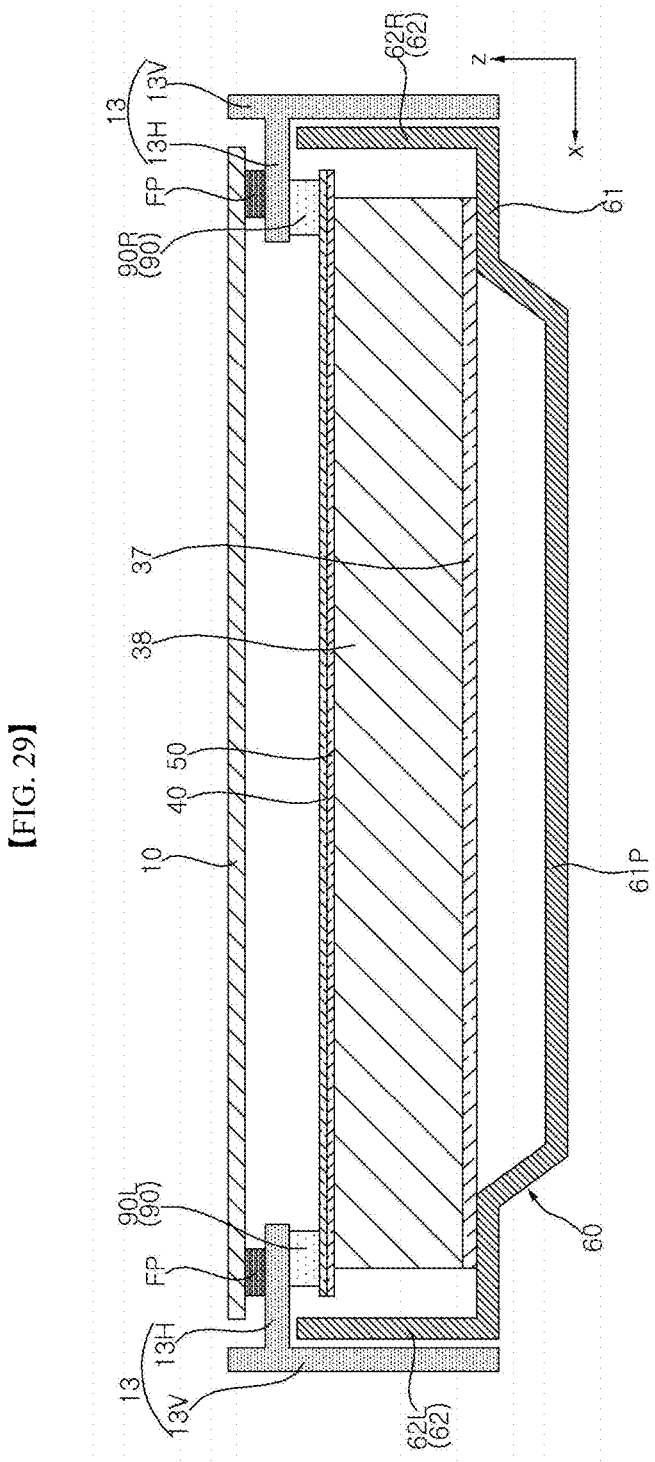
[FIG. 29]

[FIG. 30]
90,91
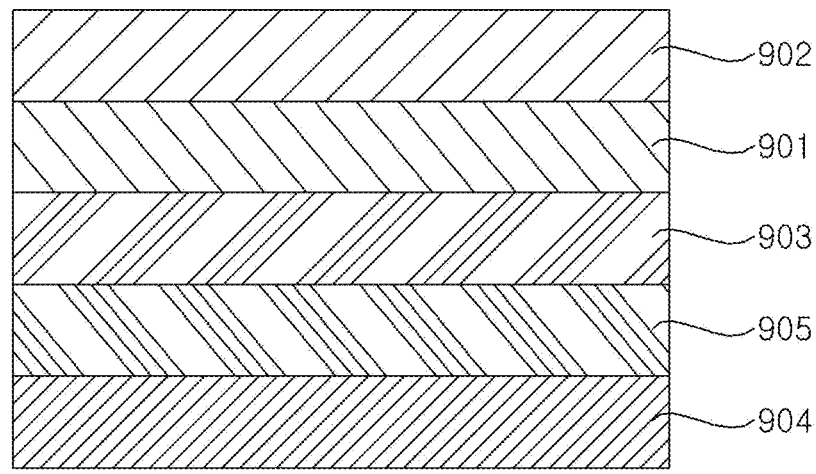

[FIG. 31]
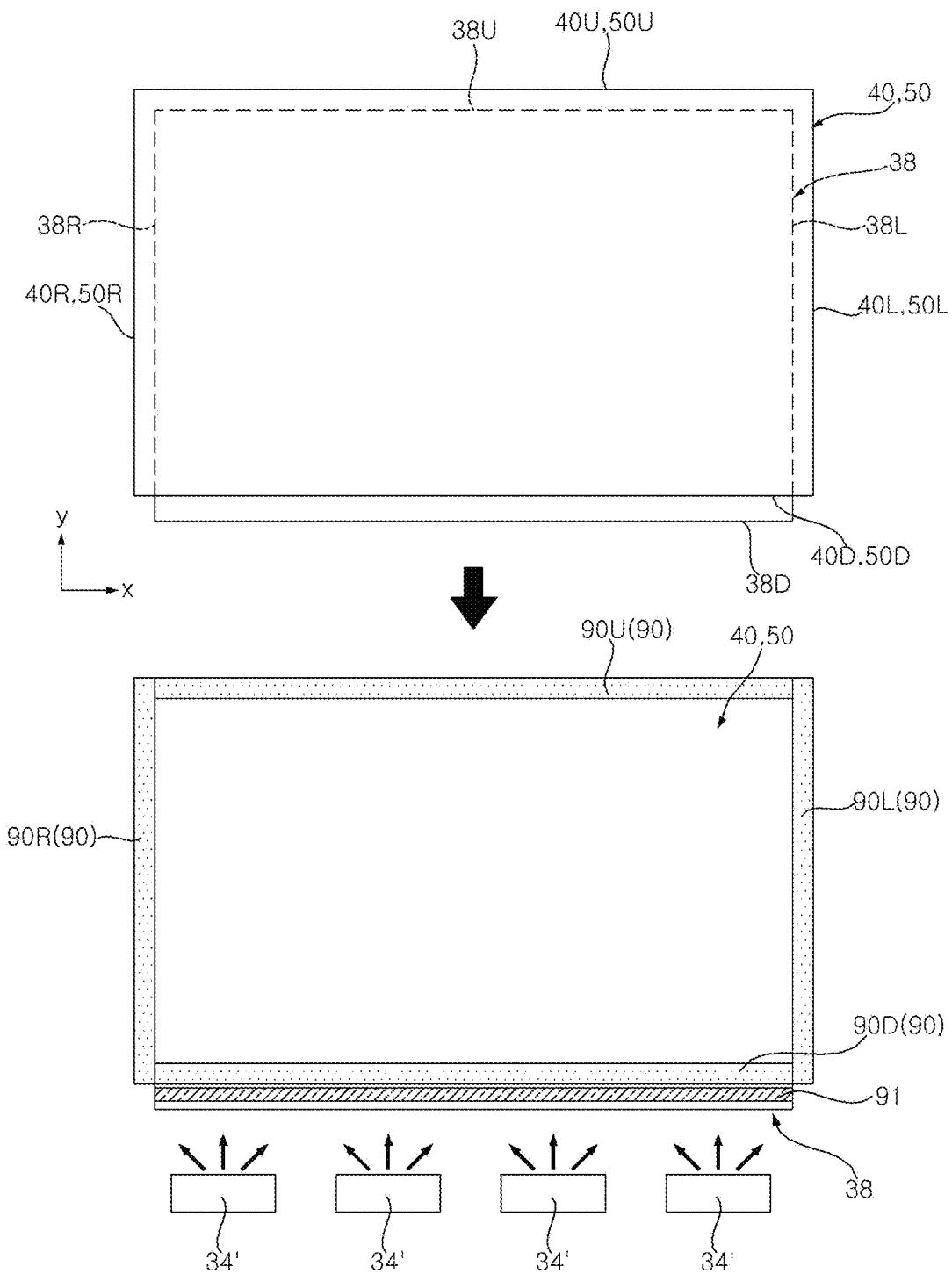

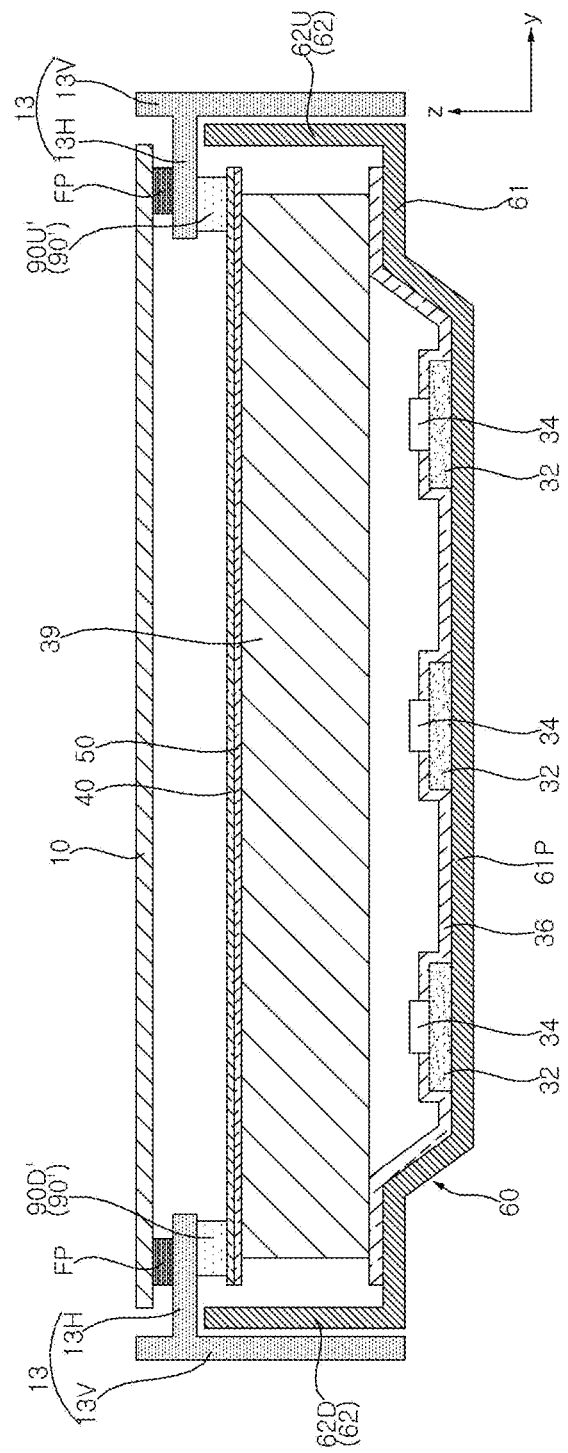
[FIG. 32]

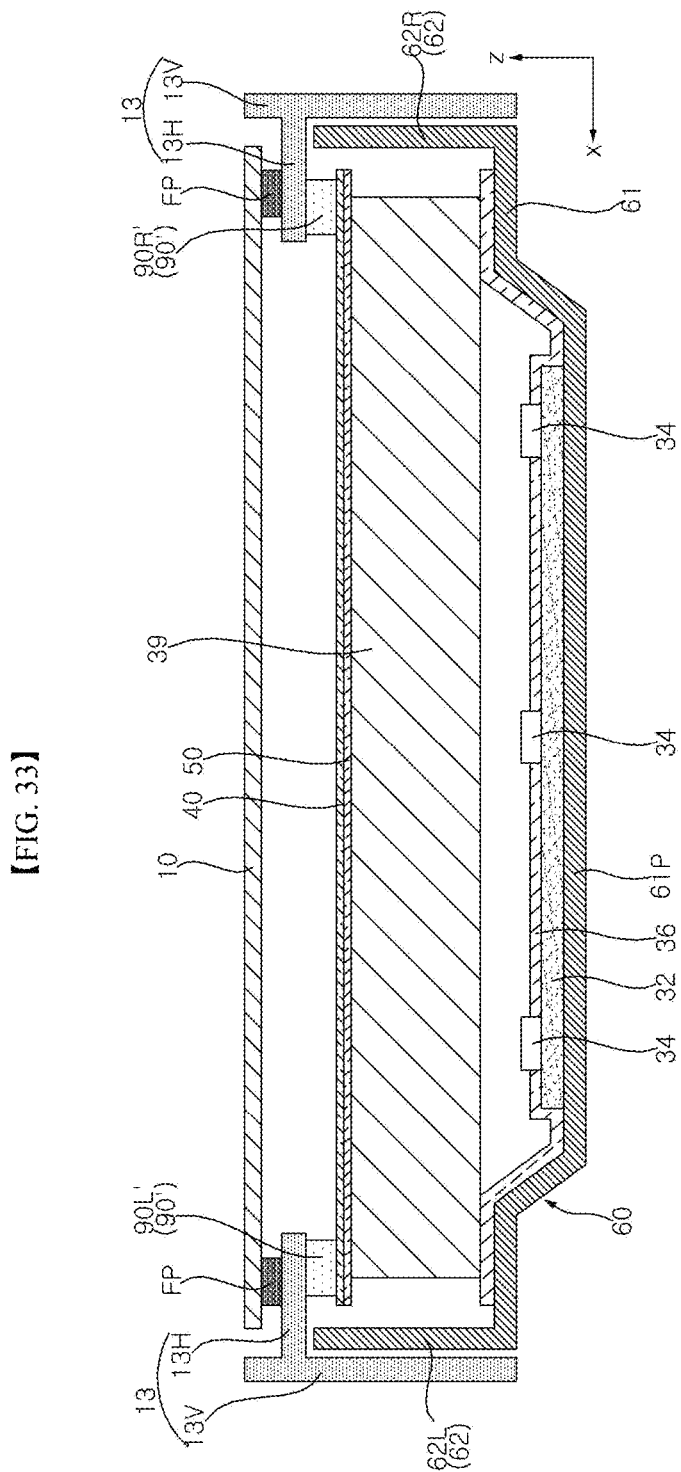
[FIG. 33]

[FIG. 34]
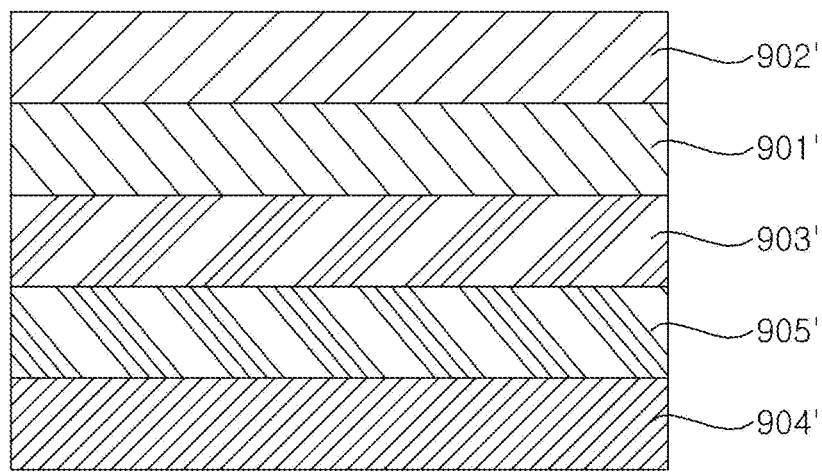

[FIG. 35]
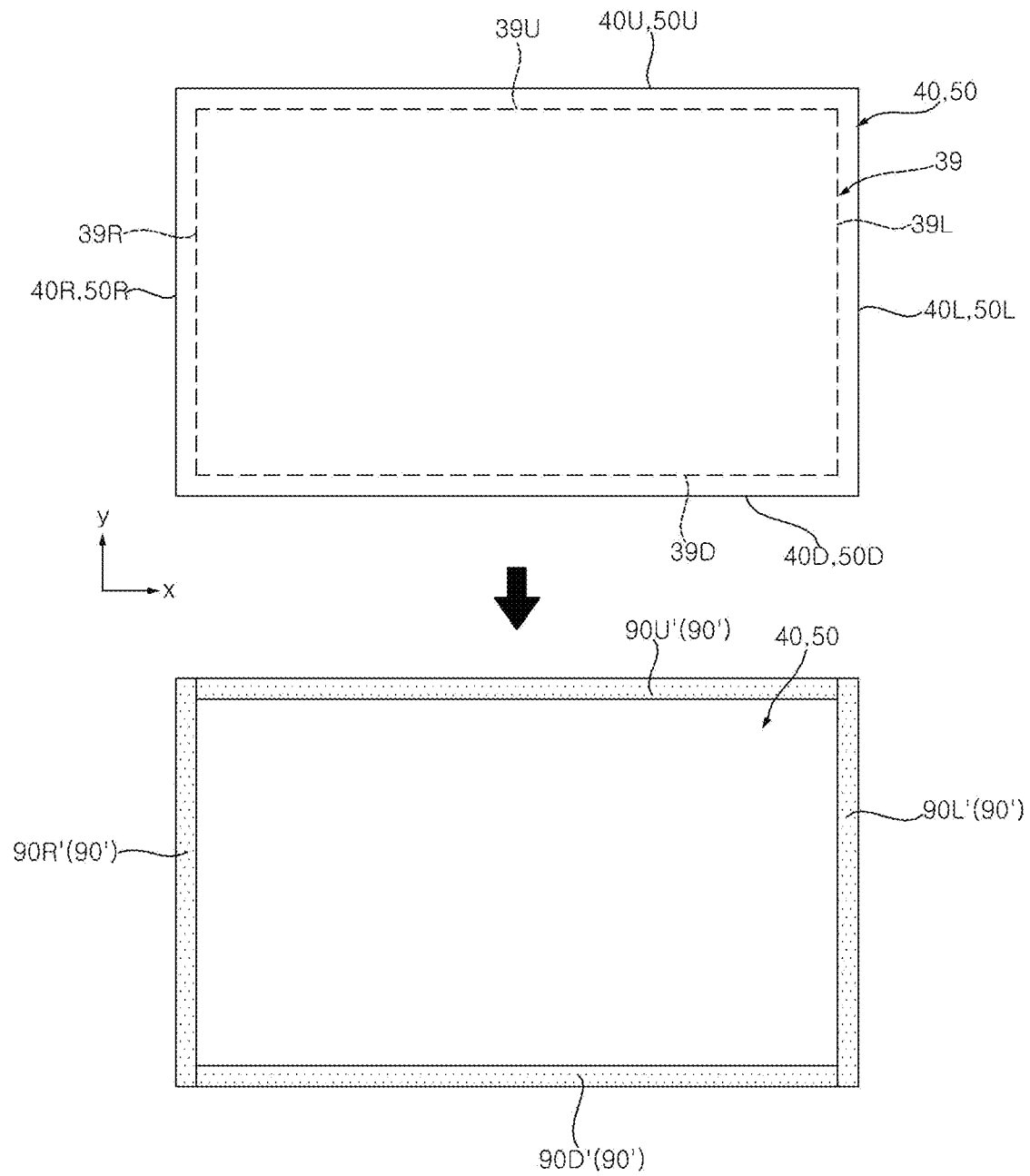

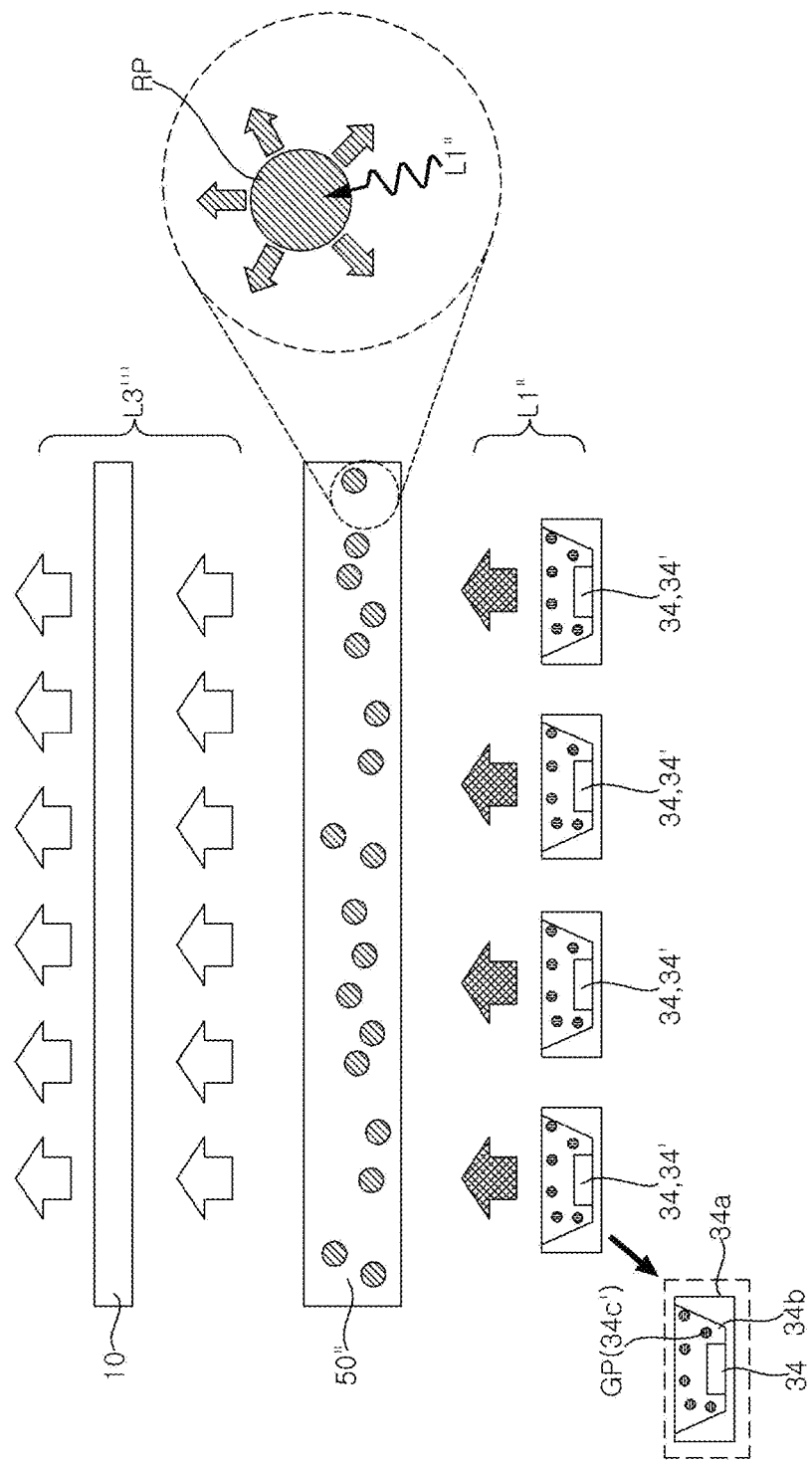

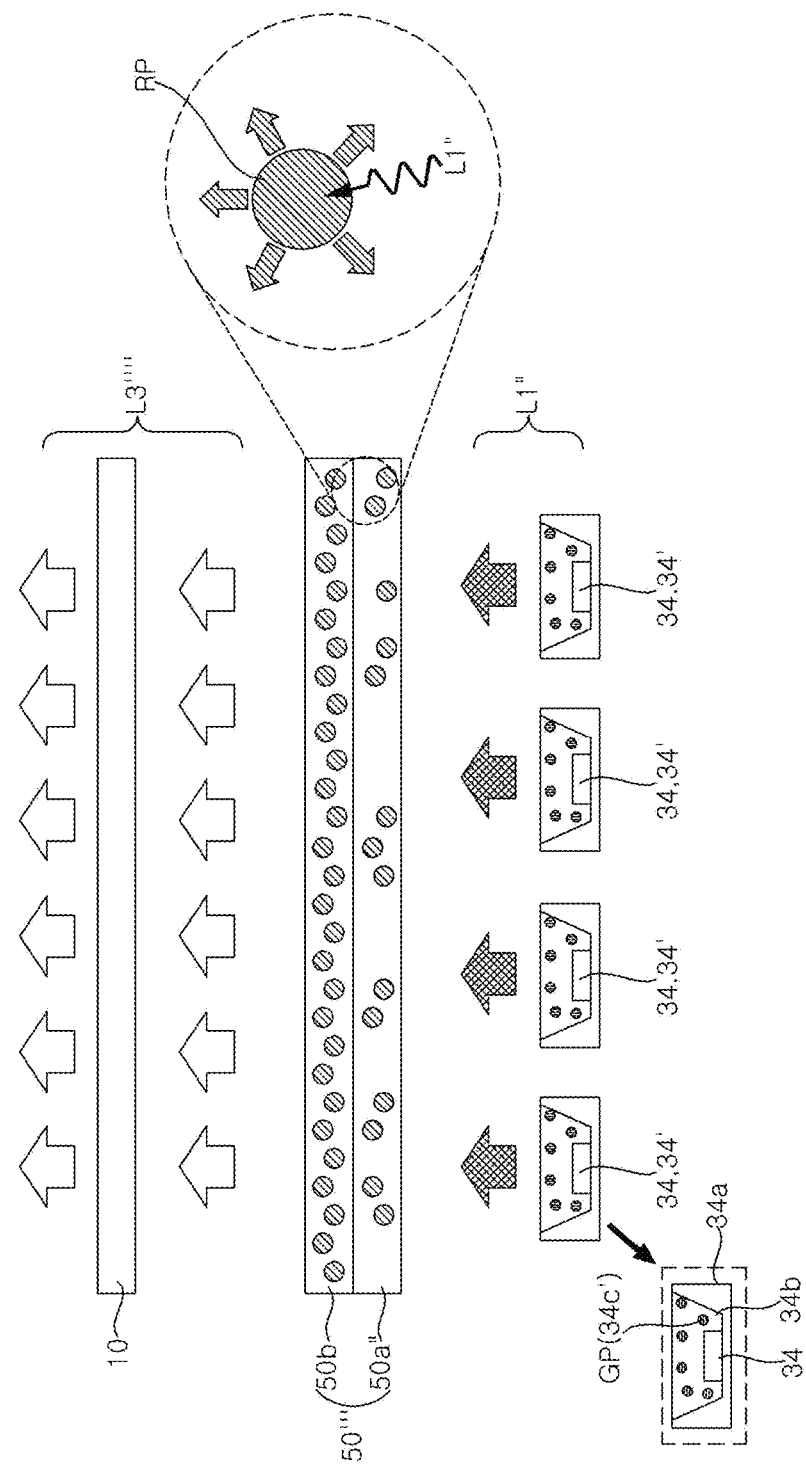
[FIG. 37]

DISPLAY DEVICE

CROSS-REFERENCE TO RELATED APPLICATIONS

This application is the National Stage filing under 35 U.S.C. 371 of International Application No. PCT/KR2022/013861, filed on Sep. 16, 2022, which claims the benefit of earlier filing date and right of priority to Korean Application Nos. 10-2022-0029011, filed on Mar. 7, 2022, and 10-2022-0029012, filed on Mar. 7, 2022, the contents of which are all hereby incorporated by reference herein in their entireties.

TECHNICAL FIELD

The present disclosure relates to a display device.

BACKGROUND ART

As the information society advances, the demand for display devices is increasing in various forms, and in response, various display devices such as an LCD (Liquid Crystal Display), a PDP (Plasma Display Panel), an ELD (Electroluminescent Display), a VFD (Vacuum Fluorescent Display), and an OLED (Organic Light Emitting Diode) display have been researched and used.

Among these display devices, LCD panels include a TFT substrate and a color substrate, which are opposite each other with a liquid crystal layer in between, and may display images using light provided by a backlight unit.

Recently, with the increasing interest in the picture quality of display devices, the ability to represent colors close to true color, or color reproduction, has become an important focus, and extensive research is being conducted to improve picture quality to achieve natural colors.

DETAILED DESCRIPTION OF INVENTION

Technical Problems

It is an object of the present disclosure to solve the above-described problems and other problems.

Another object may be to provide a display device capable of improving image quality.

Another object may be to provide a display device capable of enhancing color reproduction.

Another object may be to provide a display device capable of minimizing color differences occurring near an edge of a display panel.

Another object may be to provide a display device capable of improving the formation of blue, cyan, or purple bands on the border of a display panel.

Another object may be to a display device capable of effectively controlling a wavelength of light provided by a backlight unit.

Another object may be to provide a display device capable of reducing material costs and improving productivity by lowering the concentration of phosphors provided in a light absorbing layer.

Another object may be to provide a low-concentration light absorbing layer that may be shared by multiple display models.

Technical Solution

According to one aspect of the present disclosure for achieving the above or other objects, a display device may include: a display panel; an optical assembly providing light to the display panel; a light absorbing layer positioned on an optical path provided from the optical assembly to the display panel and absorbing light of a certain range of wavelengths; an optical plate opposing the display panel with respect to the light absorbing layer; and a first pad positioned at a front surface of the light absorbing layer adjacent to an edge of the light absorbing layer, and including a fluorescent layer, wherein white light may be incident on the display panel.

According to another aspect of the present disclosure, a display device may include: a display panel; an optical assembly providing light to the display panel; a light absorbing layer positioned on an optical path provided from the optical assembly to the display panel and absorbing light of a certain range of wavelengths; an optical plate opposite the display panel with respect to the light absorbing layer; a guide panel extending along a periphery of the optical plate, the guide panel including a vertical portion covering the periphery of the optical plate and a horizontal portion extending between the display panel and the light absorbing layer from the vertical portion; and a first pad positioned between the horizontal portion and the light absorbing layer, coupled to the horizontal portion, and adjacent to or in contact with a front surface of the light absorbing layer, wherein the first pad may include a fluorescent layer having a phosphor.

According to another aspect of the present disclosure, a display device may include: a display panel; an optical assembly providing light to the display panel; and a light absorbing layer positioned on an optical path of light provided from the optical assembly to the display panel and absorbing light of a certain range of wavelengths, the light absorbing layer may include green phosphor and red phosphor, and the optical assembly may include: a light source providing blue-based light; an encapsulant covering the light source; and a phosphor located inside the encapsulant, wherein a color temperature of an image provided by a front of the display panel may be 8,000 to 12,000K.

Effect of Invention

The effects of a display device according to the present disclosure will be described as follows.

According to at least one of the embodiments of the present disclosure, it is possible to provide a display device capable of improving image quality.

According to at least one of the embodiments of the present disclosure, it is possible to provide a display device capable of enhancing color reproduction.

According to at least one of the embodiments of the present disclosure, it is possible to provide a display device capable of minimizing color differences occurring near the edge of the display panel.

According to at least one of the embodiments of the present disclosure, it is possible to provide a display device capable of reducing the formation of blue, cyan, or purple bands on the edge of a display panel.

According to at least one of the embodiments of the present disclosure, it is possible to provide a display device capable of effectively controlling the wavelength of light provided by the backlight unit.

According to at least one of the embodiments of the present disclosure, it is possible to provide a display device capable of reducing material costs and improving productivity by lowering the concentration of the phosphor provided in the light absorbing layer.

According to at least one of the embodiments of the present disclosure, it is possible to provide a low-concentration light absorbing layer that may be shared by multiple display models.

Additional scope of applicability of the present disclosure will become apparent from the detailed description that follows. However, since various changes and modifications within the spirit and scope of the present disclosure may be clearly understood by those skilled in the art, the detailed description and specific embodiments such as preferred embodiments of the present disclosure should be understood as being given only as examples.

BRIEF DESCRIPTION OF THE DRAWING

FIGS. 1 to 37 are diagrams showing examples of display devices according to embodiments of the present disclosure.

MODE FOR CARRYING OUT THE INVENTION

Hereinafter, embodiments disclosed in the present specification will be described in detail with reference to the accompanying drawings, and identical or similar components will be assigned the same reference numbers and description thereof will not be repeated.

The suffixes "module" and "unit" for components used in the following description are given or used interchangeably only for the ease of preparing the specification and thus they should not be considered as having specific meanings or roles.

Additionally, in the following description of the embodiments disclosed herein, a detailed explanation of known functions and configurations will be omitted if it is determined that the detailed explanation may obscure the essence of the disclosed embodiments.

Furthermore, the accompanying drawings are provided solely to facilitate understanding of the embodiments disclosed herein, and the technical ideas disclosed herein should not be limited by the accompanying drawings, and it should be understood that all modifications, equivalents, and substitutes that fall within the spirit and scope of the present disclosure are included.

Terms including ordinal numbers such as first and second may be used to describe various components, but these components should not be limited by these terms. The terms are used only to distinguish one component from another.

When a component is referred to as being "connected" or "coupled" to another component, it should be understood that the component may be directly connected or coupled to the other component, or intervening components may be present. In contrast, when a component is referred to as being "directly connected" or "directly coupled" to another component, it should be understood that there are no intervening components.

Singular expressions include plural expressions unless the context clearly dictates otherwise.

In this application, the terms "comprises" and "has" are intended to specify the presence of stated features, numbers, steps, operations, components, parts, or combinations thereof, but do not preclude the presence or addition of one or more other features, numbers, steps, operations, components, parts, or combinations thereof.

The directional indications such as up (U), down (D), left (Le), right (Ri), front (F), and rear (R) shown in the drawings are for the convenience of explanation only, and the technical ideas disclosed herein should not be limited by these indications.

Referring to FIG. 1, a display device 1 may include a display panel 10. The display panel 10 may display a screen.

The display device 1 may include a first long side LS1, a second long side LS2 opposite the first long side LS1, a first short side SS1 adjacent to both the first and second long sides LS1, LS2, and a second short side SS2 opposite the first short side SS1. Meanwhile, for convenience of explanation, the length of the first and second long sides LS1 and LS2 is shown and described as being longer than that of the first and second short sides SS1 and SS2, but the lengths of the first and second long sides LS1 and LS2 may also be approximately equal to those of the first and second short sides SS1 and SS2.

A direction parallel to the long side LS1, LS2 of the display device 1 may be referred to as a left-right direction or a first direction DR1. A direction parallel to the short sides SS1, SS2 of the display device 1 may be referred to as an up-down direction or a second direction DR2. A direction perpendicular to the long and short sides LS1, LS2, SS1, SS2 of the display device 1 may be referred to as a front-rear direction or a third direction DR3.

A direction in which the display panel 10 displays an image may be referred to as a front or forward F, z, and the opposite direction may be referred to as a rear or rearward R. A direction toward the first long side LS1 may be referred to as upward U, y. A direction toward the second long side LS2 may be referred to as downward D. A direction toward the first short side SS1 may be referred to as leftward Le, x. A direction toward the second short side SS2 may be referred to as rightward Ri.

The first long side LS1, the second long side LS2, the first short side SS1, and the second short side SS2 may be each referred to as an edge of the display device 1. Additionally, the points where the first long side LS1, the second long side LS2, the first short side SS1, and the second short side SS2 meet may be referred to as corners.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Referring to FIG. 2, a display device 1 may include a display panel 10, a front cover 15, a guide panel 13, a backlight unit 20, a frame 60, and a back cover 70.

The display panel 10 may form a front surface of the display device 1 and may display images. The display panel 10 may display images by having a plurality of pixels output RGB (Red, Green, or Blue) according to the timing. The display panel 10 may be divided into an active area where an image is displayed and an inactive area where an image is not displayed. The display panel 10 may include a front substrate and a rear substrate facing each other with a liquid crystal layer interposed therebetween. The display panel 10 may be referred to as an LCD panel.

The front substrate may include a plurality of pixels composed of red, green, and blue sub-pixels. The front substrate may output light corresponding to red, green, or blue colors according to control signals.

The rear substrate may include switching elements. The rear substrate may switch pixel electrodes. For example, the pixel electrodes may change the molecular arrangement of a liquid crystal layer according to an externally input control signal. The liquid crystal layer may include liquid crystal molecules. The arrangement of the liquid crystal molecules may be changed corresponding to a voltage difference generated between the pixel electrodes and common electrodes. The liquid crystal layer may transmit or block light provided by the backlight unit 20 to the front substrate.

The front cover 15 may cover at least part of the front and side surfaces of the display panel 10. The front cover 15 may be divided into a front cover located at the front surface and a side cover located at the side surface. The front cover and the side cover may be provided separately or may be provided as one body. At least one of the front cover or the side cover may be omitted. The front cover 15 may be referred to as a case top.

The guide panel 13 may surround the perimeter of the display panel 10 and cover the side surfaces of the display panel 10. The guide panel 13 may be coupled to or support the display panel 10. The guide panel 13 may be referred to as a panel guide or side frame.

The backlight unit 20 may be located at the rear of the display panel 10. The backlight unit 20 may include light sources. The backlight unit 20 may be coupled to the frame 60 at the front of the frame 60. The backlight unit 20 may be driven in a full driving method or a partial driving method such as local dimming or impulsive driving. The backlight unit 20 may include an optical sheet 40 and an optical layer 30.

The optical sheet 40 may evenly deliver light from the light sources to the display panel 10. The optical sheet 40 may be composed of multiple layers. For example, the optical sheet 40 may include a prism sheet or a diffusion sheet. For example, the optical sheet 40 may be a Dual Brightness Enhancement Film (DBEF). A coupling part 40*d* of the optical sheet 40 may be coupled to the front cover 15, the frame 60, or the back cover 70.

The frame 60 may be located at the rear of the backlight unit 20 and may support components of the display device 1. For example, the backlight unit 20 and the configurations such as the PCB (Printed Circuit Board) where a plurality of electronic components are located may be coupled to the frame 60. The frame 60 may include a metal material such as an aluminum alloy. The frame 60 may be referred to as a main frame or module cover.

The back cover 70 may cover the rear of the frame 60. The back cover 70 may be coupled to the frame 60 and/or the front cover 15. For example, the back cover 70 may be an injection-molded product formed of a resin material. In another example, the back cover 70 may include a metal material.

Meanwhile, a cable (not shown) may be electrically connected to the display panel 10 and a source PCB (not shown). The source PCB may be located at the rear of the frame 60.

Referring to FIGS. 3 and 4, a backlight unit 20 may include an optical layer 30 and an optical sheet 40. The optical layer 30 may include a substrate 32, at least one light source 34, a reflective sheet 36, and a diffusion plate 39.

The substrate 32 may be coupled to the front of a frame 60. The substrate 32 may have a plate shape or may be composed of multiple straps spaced apart in a vertical direction. The substrate 32 may be formed of at least one of polyethylene terephthalate (PET), glass, polycarbonate (PC), or silicon. The substrate 32 may be a printed circuit board (PCB).

At least one light source 34 may be mounted on the substrate 32. A plurality of light sources 34 may be spaced apart on the substrate 32. An electrode pattern for connecting an adapter and a light source 34 may be formed in the substrate 32. For example, a carbon nanotube electrode pattern for connecting the light source 34 and the adapter may be formed on the substrate 32.

For example, the light source 34 may be a light emitting diode (LED) chip or a light emitting diode package including at least one light emitting diode chip. The light source 34 may be a colored LED emitting at least one color such as red, green, or blue, or may be a white LED. The colored LED may include at least one of a red LED, a green LED, or a blue LED. The light source 34 may be referred to as an optical assembly 34.

The reflective sheet 36 may be located in front of the substrate 32. The reflective sheet 36 may be located over areas of the substrate 32 excluding an area where the light sources 34 are formed. The reflective sheet 36 may be provided with a hole 36*a* where a light source 34 is located.

Additionally, the reflective sheet 36 may include at least one of metal or metal oxide, which is a reflective material. For example, the reflective sheet 36 may include a metal and/or metal oxide having a high reflectivity, such as at least one of aluminum (Al), silver (Ag), gold (Au), or titanium dioxide (TiO2). For example, a resin may be deposited or coated on the light source 34 and/or the reflective sheet 36. This resin may diffuse light from the light source 34. Accordingly, the reflective sheet 36 may reflect the light from the light source 34 or the light reflected from the diffusion plate 39 toward the front.

The diffusion plate 39 may be located in front of the reflective sheet 36. The diffusion plate 39 may diffuse the light from the light source 34. A spacer 36*b* may be located between the reflective sheet 36 and the diffusion plate 39 and may support the rear of the diffusion plate 39. Accordingly, an air gap may be formed between the reflective sheet 36 and the diffusion plate 39, and the light from the light source 34 may spread widely due to the air gap.

The optical sheet 40 may be located in front of the diffusion plate 39. A rear surface of the optical sheet 40 may be in close contact with the diffusion plate 39, and a front surface of the optical sheet 40 may be in close contact with or adjacent to a rear surface of the display panel 110. The optical sheet 40 may include at least one sheet.

For example, the optical sheet 40 may include a plurality of sheets with different functions. A first optical sheet 40*a* may be a diffusion sheet, while a second optical sheet 40*b* and a third optical sheet 40*c* may be prism sheets. The diffusion sheet may prevent the light emerging from the diffusion plate 39 from being partially concentrated, thus making the light distribution more uniform. The prism sheet may converge the light from the diffusion plate 39 and provide the light to the display panel 10. Meanwhile, the number and/or position of the diffusion sheets and prism sheets may vary.

The coupling portion 40*d* may be formed at least one edge of the optical sheet 40. The coupling portion 40*d* may be formed at least one of the first optical sheet 40*a*, the second optical sheet 40*b*, or the third optical sheet 40*c*.

Referring to FIGS. 5 and 6, a backlight unit 20' may include an optical layer 30' and an optical sheet 40. The optical layer 30' may be located between the frame 60 and the display panel 10. The optical layer 30' may be supported by the frame 60. The optical layer 30' may include a substrate 32', at least one light source 34', a reflective sheet 37, and a light guide plate 38.

The light guide plate 38 may be located between the frame 60 and the optical sheet 40 and may be supported by the frame 60.

The substrate 32' may be adjacent to the perimeter of the light guide plate 38 and may be coupled to one side of the guide panel 13. For example, the substrate 32' may be adjacent to a lower side of the light guide plate 38. The substrate 32' may be formed of at least one of polyethylene terephthalate (PET), glass, polycarbonate (PC), or silicon. The substrate 32' may be a printed circuit board (PCB).

At least one light source 34' may be mounted on the substrate 32'. A plurality of light sources 34' may be spaced apart from each other on the substrate 32'. An electrode pattern for connecting the adapter and the light source 34' may be formed on the substrate 32'. For example, a carbon nanotube electrode pattern for connecting the light source 34' and the adapter may be formed on the substrate 32'.

For example, the light source 34' may be a light emitting diode (LED) chip or a light emitting diode package including at least one light emitting diode chip. The light source 34' may be a colored LED emitting at least one color such as red, green, or blue, or may be a white LED. The colored LED may include at least one of a red LED, a green LED, or a blue LED. The light source 34' may be referred to as an optical assembly 34'.

The reflective sheet 37 may be located between the frame 60 and the light guide plate 38 and may be supported by the frame 60. The reflective sheet 37 may include at least one of metal or metal oxide, which is a reflective material. For example, the reflective sheet 37 may include a metal and/or metal oxide having a high reflectivity, such as at least one of aluminum (Al), silver (Ag), gold (Au), or titanium dioxide (TiO2).

Accordingly, the light source 34' may provide light through an edge of the light guide plate 38. Light entering the light guide plate 38 may be directed forward by the light guide plate 38 and the reflective sheet 37.

Referring to FIGS. 7 and 8, a display panel 10 may include a front substrate 10a, a rear substrate 10b, a color filter 10c, and polarizing films 10d and 10e. The color filter 10c may be located between the front substrate 10a and the rear substrate 10b. A first polarizing film 10d may be located at a front surface of the front substrate 10a, and a second polarizing film 10e may be located at a rear surface of the rear substrate 10b. A liquid crystal layer and a TFT may additionally be provided between the front substrate 10a and the rear substrate 10b, but descriptions thereof will be omitted.

A light source 34 and 34' may provide light to an optical sheet 40. Light dispersed and/or converged in the optical sheet 40 may be provided to the display panel 10. The display panel 10 may display an image using this light.

Additionally, the light provided by the light source 34 and 34' may be divided into light L1 not yet passing through the display panel 10 and light L2 having passed through the display panel 10. Each of the light L1 and light L2 may have a different spectra.

In addition, FIG. 8 may be an example of the spectrum of the light L1. The horizontal axis of FIG. 8 represents a wavelength nm for the light, and the vertical axis of FIG. 8 represents a radiant flux W for the light. B in FIG. 8 may be the radiant flux or distribution of blue-based light.

In this case, the light source 34, 34' may be an LED. The light sources 34, 34' may be a blue LED. The light sources 34, 34' may provide the light L1 of the wavelength and/or intensity shown in FIG. 8. For example, the light source 34, 34' may provide blue-based light in the wavelength range of 430 to 465 nm. Meanwhile, if highly pure white light is provided to the display panel 10, it is possible to achieve high-purity colors (i.e., high color expression) and good image quality on the display panel 10.

Referring to FIGS. 9 to 12, a light absorbing layer 50 may be located on an optical path of light provided by a light source 34, 34' and traveling toward the display panel 10. For example, the light absorbing layer 50 may include a QD film (Quantum Dot Enhancement Film) and/or a NOM film (Nano Organic Material Film).

Referring to FIG. 9, the light absorbing layer 50 may face the light source 34. The light absorbing layer 50 may be located at rear surface of the optical sheet 40. The light absorbing layer 50 may be formed, adhered, or deposited at the rear surface of the optical sheet 40.

Referring to FIG. 10, the light absorbing layer 50 may be opposite the light source 34 with respect to the optical sheet 40. The light absorbing layer 50 may be located at a front surface of the optical sheet 40. The light absorbing layer 50 may be formed, adhered, or deposited at the front surface of the optical sheet 40.

Referring to FIG. 11, the light absorbing layer 50 may face a front surface of the light guide plate 38. The light absorbing layer 50 may be located at rear surface of the optical sheet 40. The light absorbing layer 50 may be formed, adhered, or deposited at the rear surface of the optical sheet 40.

Referring to FIG. 12, the light absorbing layer 50 may be opposite the light guide plate 38 with respect to the optical sheet 40. The light absorbing layer 50 may be located at a front surface of the optical sheet 40. The light absorbing layer 50 may be formed, adhered, or deposited at the front surface of the optical sheet 40.

Referring to FIGS. 13 and 14, a light absorbing layer 50 may be located between a light source 34, 34' and a display panel 10. The light absorbing layer 50 may include green phosphor GP and red phosphor RP. For example, the green phosphor GP may be particles of 3 to 7 micrometers SrGa2S4, and the red phosphor RP may be particles of 1 micrometer or less (Sr,Ca)AlSiN3.

Light L1 from the light source 34, 34' may be, for example, blue-based light (see FIG. 8) and may excite the green phosphor GP. The light L1 from the light source 34, 34' may be, for example, blue-based light (see FIG. 8) and may excite the red phosphor RP. In this case, the light L1 from the light source 34, 34' may have optical properties such that blue (B)-based light (see FIG. 8) has a strong radiant flux, and as the light L1 passes through the light absorbing layer 50, the light L1 may be transformed into light L2 with increased or enhanced radiant flux of green (G)-based light (see the solid line in FIG. 14) and the red (R)-based light (see the solid line in FIG. 14).

In other words, part of the light L1 from the light source 34, 34' may pass through the light absorbing layer 50 without being absorbed or reflected by the green phosphor GP and red phosphor RP and appear as blue (B)-based light, and this blue-based light may then be mixed with the green (G)-based light and red (R)-based light, which are emitted from the light absorbing layer 50, thereby realizing white light L2.

Referring to FIGS. 15 and 16, a light absorbing layer 50 may be located between a light source 34, 34' and a display panel 10. A first light absorbing layer 50a may include green phosphor GP and a second light absorbing layer 50b may include red phosphor RP. Alternatively, the first light absorbing layer 50a may include not only the green phosphors GP but also a certain proportion of the red phosphors RP. For example, the green phosphor GP may be particles of 3 to 7 micrometers SrGa2S4, and the red phosphor RP may be particles of 1 micrometer or less (Sr,Ca)AlSiN3.

The first light absorbing layer 50a may be a QD film (Quantum Dot Enhancement Film) provided with green phosphor GP or both green phosphor GP and red phosphor RP. For example, the first light absorbing layer 50a may have a thickness of about 90 micrometers. The first light absorbing layer 50a may absorb blue-based light and emit green-based light. For example, the first light absorbing layer 50a may absorb light in the wavelength range of 400 to 500 nm. For example, the first light absorbing layer 50a may absorb light in the wavelength range of 434 to 461 nm.

The second light absorbing layer 50b may be a NOM film (Nano Organic Material Film) provided with red phosphor RP. For example, the second light absorbing layer 50b may have a thickness of about 3 micrometers. The second light absorbing layer 50b may absorb green-based light and emit red-based light. For example, the second light absorbing layer 50b may absorb light in the wavelength range of 500 to 600 nm. For example, the second light absorbing layer 50b may absorb light in the wavelength range of 524 to 557 nm.

Also, the first light absorbing layer 50a may be adhered to the second light absorbing layer 50b. For example, an adhesive may be coated on the first light absorbing layer 50a and laminated onto the second light absorbing layer 50b. The first light absorbing layer 50a and the second light absorbing layer 50b may be collectively referred to as NOF (Nano Organic Film) 50 or Hybrid NOF 50.

For example, the first light absorbing layer 50a may be located between the light source 34, 34' and the display panel 10, and the second light absorbing layer 50b may be located between the first light absorbing layer 50a and the display panel 10. In another example, the second light absorbing layer 50b may be located between the light source 34, 34' and the display panel 10, and the first light absorbing layer 50a may be located between the second light absorbing layer 50b and the display panel 10.

Light L1 from the light source 34, 34' may be, for example, blue-based light (see FIG. 8) and may excite the green phosphor GP. Light L0 emitted from the green phosphor GP upon excitation may excite the red phosphor RP. In this case, the light L1 from the light source 34, 34' may have optical properties such that blue (B)-based light (see FIG. 8) has a strong radiant flux, and as the light L1 passes through the first light absorbing layer 50a and the second light absorbing layer 50b, the light L1 may be transformed into light L3 with increased or enhanced radiant flux of green (G)-based light (see the solid line in FIG. 16) and red (R)-based light (see the solid line in FIG. 16).

In other words, part of the light L1 from the light source 34, 34' may pass through the first light absorbing layer 50a and the second light absorbing layer 50b without being absorbed or reflected by the green phosphor GP and red phosphor RP and appear as blue (B)-based light, and this blue-based light may then be mixed with the green (G)-based light and red (R)-based light, which are emitted from the first light absorbing layer 50a and the second light absorbing layer 50b, thereby realizing white light L3.

Referring to FIG. 16, the dashed line represents the spectrum of light L2 provided to a display panel 10 through the light absorbing layer 50 described above with reference to FIG. 13, and the solid line represents the spectrum of light L3 provided to the display panel 10 through the first light absorbing layer 50a and the second light absorbing layer 50b described above with reference to FIG. 15.

For example, blue (B)-based light L1, emitted from the light source 34, 34', may pass through the first light absorbing layer 50a, where the blue-based light L1 is absorbed or reflected by the green phosphor GP, exciting the green phosphor GP, and the green phosphor GP may emit green (G)-based light L0. The green (G)-based light L0, emitted from the green phosphor GP in the first light absorbing layer 50a, may pass through the second light absorbing layer 50b, where the light L0 is absorbed or reflected by the red phosphor RP, exciting the red phosphor RP, and the red phosphor RP may emit red (R)-based light. This optical conversion may be repeated by recycling between the reflective sheet (denoted by 36 in FIGS. 9 and 10, and 37 denoted by 37 in FIGS. 11 and 12) and the optical sheet 40.

Accordingly, a half-width GW3 of the green (G)-based light of the light L3 (see FIG. 15) provided to the display panel 10 may be smaller than a half-width GW2 of the light L2 (see FIG. 13) provided to the display panel 10. Here, if the half-width of the green (G)-based light decreases, the purity and color reproducibility of the green (G)-based light may be improved.

Also, a half-width RW3 of red (R)-based light of the light L3 (see FIG. 15) provided to the display panel 10 may be smaller than a half-width RW2 of the light L2 (see FIG. 13) provided to the display panel 10. Here, if the half-width of the red (R)-based light decreases, the purity and color reproducibility of the red (R)-based light may be improved.

Referring to FIG. 17, light L2 provided to a display panel 10, as described above with reference to FIG. 13, is indicated by a dashed line in the RGB color coordinates, and light L3 provided to the display panel 10, as described above with reference to FIG. 15, is indicated by a solid line in the RGB color coordinates.

Green color coordinate of the light L3 provided to the display panel 10 (see FIG. 15) may be observed to be closer to the boundary of G compared to the green color coordinate of the light L2 provided to the display panel 10 (see FIG. 13). In other words, the purity of the green in the light L3 provided to the display panel 10 may be improved, which may suggest that the color reproduction of the light L3 provided to the display panel 10 is further enhanced.

Referring to FIG. 18, the concentration of green phosphor GP in a first light absorbing layer 50a' may be reduced. For example, the concentration of the green phosphor GP in the first light absorbing layer 50a' may be 50 to 55% less than the concentration of the green phosphor GP in the first light absorbing layer 50a (see the upper diagram of FIG. 18) described above with reference to FIG. 15. For example, the concentration of the green phosphor GP in the first light absorbing layer 50a' may be 45% of the concentration of the green phosphor GP in the first light absorbing layer 50a (see the upper diagram of FIG. 18) described above with reference to FIG. 15. In this case, the light absorbing layer 50' may be referred to as a low-concentration light absorbing layer 50' or a low-concentration Hybrid NOF 50'.

Referring to FIG. 19, a thickness t11 of a low-concentration light absorbing layer 50' may differ from a thickness t10 of a light absorbing layer 50. Alternatively, the thickness t11 of the low-concentration light absorbing layer 50' may be the same as the thickness t10 of the light absorbing layer 50. For example, the thickness t11 of the low-concentration light absorbing layer 50' may be less than the thickness t10 of the light absorbing layer 50.

For example, a thickness of the first light absorbing layer 50a in the light absorbing layer 50 may be 90 micrometers. A first barrier 51 and a second barrier 52 may face each other relative to the first light absorbing layer 50a, and a thickness of each of the first barrier 51 and the second barrier 52 may be 12 micrometers. A middle layer 54 may be adhered to the first barrier 51 through an adhesive layer 54b, and a thickness of the middle layer 54 may be 50 micrometers. A second light absorbing layer 50b may be adhered to the middle layer 54 through an adhesive layer 54a, and the thickness of the second light absorbing layer 50b may be 3 micrometers. A top layer 53 may be located between a top coating 53a and the second light absorbing layer 50b, and a thickness of the top layer 53 may be 50 micrometers. A bottom layer 55 may be located between a bottom coating 55a and the second barrier 52. The bottom layer 55 may be adhered to the second barrier 52 through an adhesive layer 55b, and a thickness of the bottom layer 55 may be 100 micrometers. A thickness of the adhesive layer 54b, 54a, 55b may be 8 micrometers. A thickness of the coating 53a, 55a may be 5 micrometers. The thickness t10 of the light absorbing layer 50 may be 350 micrometers.

For example, a thickness of the first light absorbing layer 50a' in the low-concentration light absorbing layer 50' may be 90 micrometers. The first barrier 51 and the second barrier 52 may face each other relative to the first light absorbing layer 50a', and a thickness of each of the first barrier 51 and the second barrier 52 may be 12 micrometers. The second light absorbing layer 50b may be provided with an adhesive layer and may be adhered to the first barrier 51. A thickness of the second light absorbing layer 50b provided with the adhesive layer may be 8 micrometers. The top layer 53 may be located between the top coating 53a and the second light absorbing layer 50b, and a thickness of the top layer 53 may be 5 micrometers. A bottom layer 55 may be located between a bottom coating 55a and the second barrier 52. The bottom layer 55 may be adhered to the second barrier 52 through an adhesive layer 55b, and a thickness of the bottom layer 55 may be 75 micrometers. A thickness of the adhesive layer 55b may be 5 micrometers. A thickness of the coating 53a, 55a may be 5 micrometers. The thickness t11 of the low-concentration light absorbing layer 50' may be 290 micrometers.

Referring to FIGS. 18 and 20, the dashed line in FIG. 20 represents the spectrum of light L3 provided to the display panel 10 through the light absorbing layer 50, i.e., the Hybrid NOF 50, which is described above with reference to the upper diagram of FIG. 18, and the solid line in FIG. 20 represents the spectrum of light L3' provided to the display panel 10 through the low-concentration light absorbing layer 50', i.e., the low-concentration Hybrid NOF 50', which is described above with reference to the lower diagram of FIG. 18.

For example, blue (B)-based light L1 emitted from a light source 34, 34' may pass through the first light absorbing layer 50a', where the light L1 is absorbed or reflected by green phosphor GP, exciting the green phosphor GP, and the green phosphor GP may emit green (G)-based light. The green (G)-based light emitted by the green phosphor GP in the first light absorbing layer 50a' may pass through the second light absorbing layer 50b, where the green (G)-based light is absorbed or reflected by red phosphor RP, exciting the red phosphor RP, and the red phosphor RG may emit red (R)-based light. This optical conversion may be repeated by recycling between a reflective sheet (denoted by 36 in FIGS. 9 and 10, and 37 denoted by 37 in FIGS. 11 and 12) and an optical sheet 40.

In this case, since the green phosphor GP is provided in a lower concentration in the first light absorbing layer 50a', an optical conversion rate of the low-concentration light absorbing layer 50' may be lower than that of the light absorbing layer 50.

Therefore, compared to the case where the light L1 from the light source 34, 34' passes through the light absorbing layer 50, when the light L1 passes through the low-concentration light absorbing layer 50', the radiant flux of the blue (B)-based light may increase or be enhanced, while the radiant flux of the green (G)-based light and the red (R)-based light may decrease or be weakened. In this case, a color temperature of an image provided at the front surface of the display panel 10 may be between 15,000 and 18,000K.

Referring to FIGS. 20 and 21, a light source 34, 34' may be a blue LED. In this case, to achieve the desired color temperature, the concentration of green phosphor GP in the Hybrid NOF 50 may be adjusted for each model (display panel). In this case, the number of types of Hybrid NOF 50 may increase with the number of models (display panels), potentially reducing productivity and leading to mixing of Hybrid NOF 50 between models.

Referring to FIG. 22, phosphor 34c may be located around a light source 34, 34'. For example, the phosphor 34c may be in powder form.

For example, an encapsulant 34b may be provided with the phosphor 34c and cover the light source 34, 34'. The liquid encapsulant 34b mixed with the phosphor 34c may cover the light source 34, 34' and be hardened.

In another example, a housing 34a may provide a concave space where the light source 34, 34' is located. The encapsulant 34b may be provided with the phosphor 34c. The liquid encapsulant 34b mixed with the phosphor 34c may fill the space of the housing 34a and be hardened, and may cover the light source 34, 34'.

The light from the light source 34, 34' may be blue-based light. For example, the light source 34, 34' may be a blue LED. The phosphor 34c may be yellow and/or a color (alpha) different from yellow. The phosphor 34c may include yellow phosphor YP and red phosphor AP. For example, the yellow phosphor YP may be YAG (Yttrium Aluminum Garnet), La3Si6N11, LuAG (Al5Lu3O12), or a silicate. For example, the red phosphor AP may be (Sr, Ca)AlSiN3:Eu or (Sr, Ca, Ba) 2SiN8:Eu.

For example, in the phosphor 34c, the proportion of the yellow phosphor YP may be between 42% and 62%, the proportion of the red phosphor AP may be between 37% and 57%, and the phosphors YP and AP may be mixed to total 100% within the range of the above ratios.

For example, the content ratio of the red phosphor AP to the yellow phosphor YP may be between 0.71 and 0.93.

For example, a content of the phosphors YP and AP in the encapsulant 34b may be between 5% and 10%. The encapsulant 34b may include a silicon material. Meanwhile, if a content of the phosphor YP and AP in the encapsulant 34b is 25%, the light source 34, 34' and the phosphors YP and AP may form a white LED assembly.

Accordingly, the blue-based light from the light source 34, 34' may be absorbed or reflected by the phosphors YP and AP, exciting the phosphors YP and AP, and the phosphors YP and AP may emit yellow and/or red-based light.

Referring to FIGS. 22 and 23, the dashed line in FIG. 23 represents the spectrum of light L3' provided to the display panel 10 through the low-concentration absorption layer 50', or low-concentration Hybrid NOF 50', which is described above with reference to the lower diagram of FIG. 18. Also, the solid line in FIG. 23 represents the spectrum of light L3" which is provided to the display panel 10 after the light L1' emitted as blue-based light from the light source 34, 34' passes through the phosphor 34c and encapsulant 34b and then through the low-concentration absorption layer 50', i.e., low-concentration Hybrid NOF 50'.

For example, light L1' (especially the blue (B)-based light), emitted as blue (B)-based light from the light source 34, 34' and passing through the phosphor 34c and encapsulant 34b, may pass through the first light absorbing layer 50a', where the light L1' is absorbed or reflected by the green phosphor GP, exciting the green phosphor GP, and the green phosphor GP may emit green (G)-based light. The green (G)-based light L0' emitted by the green phosphor GP in the first light absorbing layer 50a' may pass through the second light absorbing layer 50b, where the light L0' is absorbed or reflected by the red phosphor RP, exciting the red phosphor RP, and the red phosphor RP emit red (R)-based light. This optical conversion may be repeated by recycling between the reflective sheet (denoted by 36 in FIGS. 9 and 10, and 37 denoted by 37 in FIGS. 11 and 12) and the optical sheet 40.

Therefore, compared to the case where the light from the light source 34, 34' does not pass through the phosphor 34c and encapsulant 34b, when the light passes through the phosphor 34c and encapsulant 34b, the light L3" provided to the display panel 10 after passing through the low-concentration Hybrid NOF 50' may have a reduced or weakened radiant flux of the blue (B)-based light and an increased or enhanced radiant flux of the green (G)-based light and red (R)-based light.

For example, a peak (central) wavelength of the blue (B)-based light L3" may be between 443 and 450 nm. For example, a peak (central) wavelength of the green (G)-based light L3" may be between 530 and 550 nm. For example, a peak (central) wavelength of the red (R)-based light L3" may be between 610 and 630 nm.

This light L3" may realize white light. Additionally, a color temperature of an image provided at the front surface of the display panel 10 may be between 8,000 and 12,000K.

Furthermore, based on the radiant flux of the blue (B)-based light provided to the display panel 10, the radiant flux of the green (G)-based light may be between 20% and 70%. Based on the radiant flux of the blue (B)-based light provided to the display panel 10, the radiant flux of the red (R)-based light may be between 20% and 70%.

For example, based on the radiant flux of the blue (B)-based light provided to the display panel 10, the radiant flux of the green (G)-based light may be between 35% and 40%. Based on the radiant flux of the blue (B)-based light provided to the display panel 10, the radiant flux of the red (R)-based light may be between 21% and 28%.

In another example, based on the radiant flux of the blue (B)-based light provided to the display panel 10, the radiant flux of the green (G)-based light may be 37%. Based on the radiant flux of the blue (B)-based light provided to the display panel 10, the radiant flux of the red (R)-based light may be 25%.

Referring to FIGS. 22 and 24, a light source 34, 34' and phosphor 34c may be collectively referred to as an optical assembly 34, 34', 34c.

To achieve a desired color temperature, for example, Model A (Display Panel A), Model B (Display Panel B), Model C (Display Panel C), Model D (Display Panel D), and Model E (Display Panel E) may be respectively combined with optical assembly 34, 34', 34c located at a first rank (RA), a second rank (RB), a third rank (RC), a fourth rank (RD), and a fifth rank (RE) in the CIE color coordinates.

In this case, Model A (Display Panel A), Model B (Display Panel B), Model C (Display Panel C), Model D (Display Panel D), and Model E (Display Panel E) may share the same low-concentration absorption layer 50'.

Accordingly, to achieve a desired color temperature, it is possible to combine the optical assembly 34, 34', 34c at a specific rank for each model (display panel) without the need to adjust the concentration of the green phosphor GP in the low-concentration absorption layer 50'. In this case, the single low-concentration light absorbing layer 50' may be used for multiple models (display panels), thereby improving productivity.

Referring to FIGS. 25 and 26, a frame 60 may include a flat portion 61 and a bending portion 62. The flat portion 61 may form the front surface of the frame 60 and may be formed to be generally flat. The bending portion 62 may be bent forward around the flat portion 61 and may extend along the perimeter of the flat portion 61. The press portion 61P adjacent to one side of the flat portion 61 and may be formed by being pressed backward from the flat portion 61.

A housing 80 may be adjacent to a lower side of the frame 60 and may be located on the press portion 61P. The housing 80 may include a rear part 81, a protrusion 82, and a side part 83. The rear part 81 may be located on the press portion 61P. The protrusion 82 may protrude forward from a front surface of the rear part 81. The side part 83 may be bent between the bending portion 62 and the protruding portion 82 at a lower side of the rear part 81 and may protrude forward from the protruding portion 82. The housing 80 may include a metal material such as aluminum (Al) and may be referred to as a heat sink.

A guide panel 13 may include a vertical portion 13V and a horizontal portion 13H. The vertical portion 13V may extend along the bending portion 62 and cover the outside of the bending portion 62. The horizontal portion 13H may intersect with the vertical portion 13V and may partially cover the frame 60 and the front of a light guide plate 38 (see FIG. 5).

The light guide plate 38 may be located between the horizontal portion 13H and the protruding portion 82. The reflective sheet 37 may be coupled to a rear surface of the light guide plate 38 and may be located on the protrusion 82. An optical sheet 40 may be located in front of the light guide plate 38. For example, a light absorbing layer 50 may be located between the optical sheet 40 and the light guide plate 38, and may be coupled to the optical sheet 40 and the light guide plate 38. In another example, the light absorbing layer 50 may be opposite the light guide plate 38 with respect to the optical sheet 40 and may be coupled to a front surface of the optical sheet 40.

Accordingly, a bottom of the light guide plate 38 may be supported by the protrusion 82, and the remaining portion of the light guide plate 38 may be supported by the flat portion 61.

A display panel 10 may be opposite the optical sheet 40 with respect to the horizontal portion 13H. A front pad FP may be located between the display panel 10 and the horizontal portion 13H, and may be coupled or adhered to the horizontal portion 13H.

The first pad 90 may be located between the horizontal portion 13H and the optical sheet 40, and may be coupled or adhered to the horizontal portion 13H. The first pad 90 may be adjacent to or in contact with the front surface of the optical sheet 40.

The second pad 91 may be located between the horizontal portion 13H and the light guide plate 38, and may be coupled or adhered to the horizontal portion 13H. The second pad 91 may be adjacent to or in contact with the front surface of the light guide plate 38.

A front cover 15 may include a first part 15V and a second part 15H. The first part 15V may extend along the vertical portion 13V and may cover the outside of the vertical portion 13V. The second part 15H may intersect with the first part 15V and may partially cover the guide panel 13 and the front of the display panel 10. A pad DP may be located between the second part 15H and the display panel 10, and may be coupled or adhered to the second part 15H.

Meanwhile, a cable (not shown) may be electrically connected to the display panel 10 and a source PCB (not shown). The source PCB may be located at the rear of the frame 60.

Referring to FIGS. 25 and 27, a housing 80 may extend long in the left-right direction. A height h2 of a side part 83 of the housing 80 may be greater than a height h1 of a protrusion 82 of the housing 80.

A substrate 32' may be located between the side part 83 and the protrusion 82, and may be coupled to the side part 83. The substrate 32' may extend along the side part 83.

A plurality of light sources 34' may be located between the substrate 32' and the protrusion 82 and may be mounted on the substrate 32'. The plurality of light sources 34' may be spaced apart from each other in a longitudinal direction of the substrate 32', that is, in the left-right direction.

A guard 33 may be located between the substrate 32' and the protrusion 82 and may be located on the substrate 32'. The guard 33 may extend in the longitudinal direction of the substrate 32', that is, in the left-right direction. A plurality of slots 33S may be formed in the guard 33, and may have the light sources 34' located therein. The guard 33 may be an injection-molded product formed of resin or silicone. A thickness of the guard 33 may be greater than a thickness of the light source 34', and may prevent collision between the light guide plate 38 and the light sources 34'.

In this case, the light source 34' may face the lower side of the light guide plate 38. The light sources 34' may be operated by receiving power from a power device (not shown) through the substrate 32'. Accordingly, light from the light sources 34' may be provided to the lower side of the light guide plate 38. The light incident on the light guide plate 38 may be provided forward by the light guide plate 38 and the reflective sheet 37.

Referring to FIG. 28, a first bending portion 62U may form an upper side of a frame 60 and may face an upper side of a light guide plate 38. A second bending portion 62D may form a lower side of the frame 60 and may be coupled to a side part 83 of a housing 80.

A part of the second bending portion 62D adjacent to an upper side of the light guide plate 38 may be supported by the flat portion 61. A part of the second bending portion 62D adjacent to a lower side of the light guide plate 38 may be supported by the protrusion 82.

A first upper pad 90U may be located between the horizontal portion 13H and the optical sheet 40 and may be coupled or adhered to the horizontal portion 13H. The first upper pad 90U may be adjacent to an upper side of the optical sheet 40 and may be adjacent to or in contact with the front surface of the optical sheet 40.

A first lower pad 90D may be located between the horizontal portion 13H and the optical sheet 40 and may be coupled or adhered to the horizontal portion 13H. The first lower pad 90D may be adjacent to a lower side of the optical sheet 40 and may be adjacent to or in contact with the front side of the optical sheet 40.

A second pad 91 may be located between the horizontal portion 13H and the light guide plate 38 and may be located between the lower side of the optical sheet 40 and the side part 83. The second pad 91 may be coupled or adhered to the horizontal portion 13H and may be adjacent to or in contact with the front surface of the light guide plate 38.

The first upper pad 90U, first lower pad 90D, and second pad 91 may be located on an optical path of light emitted from the light source 34'.

Referring to FIG. 29, a third bending portion 62L may form a left side of a frame 60 and may face a left side of the light guide plate 38. A fourth bending portion 62R may form a right side of the frame 60 and may face a right side of the light guide plate 38.

A part of the fourth bending portion 62R adjacent to a left side of the light guide plate 38 may be supported by the flat portion 61. A part of the fourth bending portion 62R adjacent to a right side of the light guide plate 38 may be supported by the flat portion 61.

A first left pad 90L may be located between a horizontal portion 13H and an optical sheet 40 and may be coupled or adhered to the horizontal portion 13H. The first left pad 90L may be adjacent to the left side of the optical sheet 40 and may be adjacent to or in contact with the front side of the optical sheet 40.

A first right pad 90R may be located between the horizontal portion 13H and the optical sheet 40 and may be coupled or adhered to the horizontal portion 13H. The first right pad 90R may be adjacent to a right side of the optical sheet 40 and may be adjacent to or in contact with the front surface of the optical sheet 40.

The first left pad 90L and first right pad 90R may be located on an optical path of light emitted from the light source 34'.

Referring to FIG. 30, the above-described first pad 90 (90U, 90D, 90L, 90R) and the second pad 91 may have the same structure. Each of the first pad 90 and the second pad 91 may include a fluorescent layer 901.

The fluorescent layer 901 may include phosphor. The color of light emitted from the phosphor in the fluorescent layer 901 may be the complementary color of the light emitted from the light source 34' and incident on the light guide plate 38 (see FIG. 28). Additionally, a plurality of layers 902, 903, 904, and 905 may be located in front of and behind the fluorescent layer 901.

For example, a first layer 902 may be coupled or adhered to a front surface of the fluorescent layer 901. A second layer 903 may be coupled or adhered to a rear surface of the fluorescent layer 901. A third layer 904 and a fourth layer 905 may be coupled or adhered to a rear surface of the second layer 903.

For example, the fluorescent layer 901 may include an acrylic material and may function as an adhesive layer. In this case, the first layer 902 and the second layer 903 may be adhered to the fluorescent layer 901.

For example, the fourth layer 905 may include an acrylic material and may function as an adhesive layer. In this case, the second layer 903 and the third layer 904 may be adhered to the fourth layer 905.

For example, the first layer 902, the second layer 903, and the third layer 904 may each include a PET material.

Referring to FIG. 31, the optical sheet 40 and the light absorbing layer 50 may be offset upward from the light guide plate 38. The optical sheet 40 and the light absorbing layer 50 may be larger in size than the light guide plate 38.

Upper sides 40U and 50U of the optical sheet 40 and the light absorbing layer 50 may be spaced upward from an upper side 38U of the light guide plate 38. Lower sides 40D and 50D of the optical sheet 40 and the light absorbing layer 50 may be spaced upward from a lower side 38D of the light guide plate 38. Left sides 40L and 50L of the optical sheet 40 and the light absorbing layer 50 may be spaced leftward from a left side 38L of the light guide plate 38. Right sides 40R and 50R of the optical sheet 40 and the light absorbing layer 50 may be spaced rightward from a right side 38R of the light guide plate 38.

The first upper pad 90U may be adjacent to the upper side 40U of the optical sheet 40, may extend in the left-right direction, and may be located on the optical sheet 40. The first lower pad 90D may be adjacent to the lower side 40D of the optical sheet 40, may extend in the left-right direction, and may be located on the optical sheet 40. The first left pad 90L may be adjacent to the left side 40L of the optical sheet 40, may extend in the up-down direction, and may be located on the optical sheet 40. The first right pad 90R may be adjacent to the right side 40R of the optical sheet 40, may extend in the up-down direction, and may be located on the optical sheet 40.

In this case, a left end of the first upper pad 90U may be adjacent to an upper end of the first left pad 90L, and a right end of the first upper pad 90U may be adjacent to an upper end of the first right pad 90R. A left end of the first lower pad 90D may be adjacent to a lower end of the first left pad 90L, and a right end of the first lower pad 90D may be adjacent to a lower end of the first right pad 90R.

For example, a left end of the first upper pad 90U may be adjacent to or in contact with the right side of the first left pad 90L, and a right end of the first upper pad 90U may be adjacent to or in contact with a left side of the first right pad 90R.

For example, the left end of the first lower pad 90D may be adjacent to or in contact with the right side of the first left pad 90L, and the right end of the first lower pad 90D may be adjacent to or in contact with the left side of the first right pad 90R.

That is, the first upper pad 90U and the first lower pad 90D may meet the first left pad 90L and the first right pad 90R to form corners.

The second pad 91 may be located between the lower side 40D of the optical sheet 40 and the lower side 38D of the light guide plate 38, may extend in the left-right direction, and may be located on the light guide plate 38.

For example, the second pad 91 may be arranged parallel to the first lower pad 90D. A guide rib 13Hv (see FIG. 4) may protrude between the first lower pad 90D and the second pad 91 from the horizontal portion 13H. The guide rib 13Hv may guide the coupling of the first lower pad 90D and the second pad 91 to the horizontal portion 13H.

Referring to FIGS. 32 and 33, a frame 60 may include a flat portion 61 and a bending portion 62. The flat portion 61 may form the front surface of the frame 60 and may be formed to be generally flat. The bending portion 62 may be bent forward around the flat portion 61 and may extend along the perimeter of the flat portion 61. A press portion 61P may be formed by pressing backward from the flat portion 61, and may have a substrate 32 mounted thereon.

A guide panel 13 may include a vertical portion 13V and a horizontal portion 13H. The vertical portion 13V may extend along the bending portion 62 and cover the outside of the bending portion 62. The horizontal portion 13H may intersect with the vertical portion 13V and may partially cover the front of the frame 60 and the front of a diffusion plate 39 (see FIG. 3).

The diffusion plate 39 may be located between the horizontal portion 13H and the frame 60. A reflective sheet 36 may be located between the diffusion plate 39 and the frame 60. The optical sheet 40 may be located between the horizontal portion 13H and the diffusion plate 39. For example, a light absorbing layer 50 may be located between the optical sheet 40 and the diffusion plate 39, and may be coupled to the optical sheet 40 and the diffusion plate 39. In another example, the light absorbing layer 50 may be opposite the diffusion plate 39 with respect to the optical sheet 40 and may be coupled to a front surface of the optical sheet 40.

Accordingly, a peripheral portion of the diffusion plate 39 may be supported by the frame 60.

The display panel 10 may be opposite the optical sheet 40 with respect to the horizontal portion 13H. A front pad FP may be located between the display panel 10 and the horizontal portion 13H, and may be coupled or adhered to the horizontal portion 13H.

A first pad 90' may be located between the horizontal portion 13H and the optical sheet 40, and may be coupled or adhered to the horizontal portion 13H. The first pad 90' may be adjacent to or in contact with the front surface of the optical sheet 40.

Referring again to FIG. 32, a first bending portion 62U may form an upper side of the frame 60 and face an upper side of the diffusion plate 39. A second bending portion 62D may form a lower side of the frame 60 and face a lower side of the diffusion plate 39.

A part of the second bending portion 62D adjacent to the upper side of the diffusion plate 39 and a part of the second bending portion 62D adjacent to the lower side of the diffusion plate 39 may be supported by the flat portion 61.

The first upper pad 90U' may be located between the horizontal portion 13H and the optical sheet 40, and may be coupled or adhered to the horizontal portion 13H. A first upper pad 90U' may be adjacent to the upper side of the optical sheet 40, and may be adjacent to or in contact with the front surface of the optical sheet 40.

A first lower pad 90D' may be located between the horizontal portion 13H and the optical sheet 40, and may be coupled or adhered to the horizontal portion 13H. The first lower pad 90D' may be adjacent to the lower side of the optical sheet 40, and may be adjacent to or in contact with the front surface of the optical sheet 40.

The first upper pad 90U' and the first lower pad 90D' may be located on an optical path of light emitted from the light source 34.

Referring again to FIG. 33, a third bending portion 62L may form a left side of the frame 60 and may face the left side of the diffusion plate 39. A fourth bending portion 62R may form a right side of the frame 60 and face a right side of the diffusion plate 39.

A part of the fourth bending portion 62R adjacent to the left side of the diffusion plate 39 and a part of the fourth bending portion 62R adjacent to the right side of the diffusion plate 39 may be supported by the flat portion 61.

A first left pad 90L' may be located between the horizontal portion 13H and the optical sheet 40, and may be coupled or adhered to the horizontal portion 13H. The first left pad 90L' may be adjacent to the left side of the optical sheet 40, and may be adjacent to or in contact with the front surface of the optical sheet 40.

The first right pad 90R' may be located between the horizontal portion 13H and the optical sheet 40, and may be coupled or adhered to the horizontal portion 13H. The first right pad 90R' may be adjacent to the right side of the optical sheet 40, and may be adjacent to or in contact with the front of the optical sheet 40.

The first left pad 90L' and the first right pad 90R' may be located on an optical path of light emitted from the light source 34.

Referring to FIG. 34, the above-described first pad 90' (90U', 90D', 90L', 90R') may include a fluorescent layer 901'.

The fluorescent layer 901' may include phosphor. The color of the light emitted from the phosphor of the fluorescent layer 901' may be the complementary color of the light incident on the diffuser plate 39 (see FIG. 33) emitted from the light source 34'. Also, a plurality of layers 902', 903', 904', and 905' may be located in front of and behind the fluorescent layer 901'.

For example, a first layer 902' may be coupled or adhered to the front of the fluorescent layer 901'. A second layer 903' may be coupled or adhered to a rear surface of the fluorescent layer 901'. A third layer 904' and a fourth layer 905' may be coupled or adhered to the back of the second layer 903'.

For example, the fluorescent layer 901' may include an acrylic material and may function as an adhesive layer. In this case, the first layer 902' and the second layer 903' may be adhered to the fluorescent layer 901'.

For example, the fourth layer 905' may include an acrylic material and may function as an adhesive layer. In this case, the second layer 903' and the third layer 904' may be adhered to the fourth layer 905'.

For example, the first layer 902', the second layer 903', and the third layer 904' may each include a PET material.

Referring to FIG. 35, the optical sheet 40 and the light absorbing layer 50 may be larger in size than the diffusion plate 39.

Upper sides 40U and 50U of the optical sheet 40 and the light absorbing layer 50 may be spaced upward from an upper side 39U of the diffusion plate 39. Lower sides 40D and 50D of the optical sheet 40 and the light absorbing layer 50 may be spaced downward from a lower side 39D of the diffusion plate 39. Left sides 40L and 50L of the optical sheet 40 and the light absorbing layer 50 may be spaced leftward from a left side 39L of the diffusion plate 39. Right sides 40R and 50R of the optical sheet 40 and the light absorbing layer 50 may be spaced rightward from a right side 39R of the diffusion plate 39.

The first upper pad 90U' may be adjacent to the upper side 40U of the optical sheet 40, may extend in the left-right direction, and may be located on the optical sheet 40. The first lower pad 90D' may be adjacent to the lower side 40D of the optical sheet 40, may extend in the left-right direction, and may be located on the optical sheet 40. The first left pad 90L' may be adjacent to the left side 40L of the optical sheet 40, may extend in the vertical direction, and may be located on the optical sheet 40. The first right pad 90R' may be adjacent to the right side 40R of the optical sheet 40, may extend in the up-down direction, and may be located on the optical sheet 40.

In this case, a left end of the first upper pad 90U' may be adjacent to an upper end of the first left pad 90L', and a right end of the first upper pad 90U' may be adjacent to an upper end of the first right pad 90R'. A left end of the first lower pad 90D' may be adjacent to a lower end of the first left pad 90L', and a right end of the first lower pad 90D' may be adjacent to a lower end of the first right pad 90R'.

For example, the left end of the first upper pad 90U' may be adjacent to or in contact with the right side of the first left pad 90L', and the right end of the first upper pad 90U' may be adjacent to or in contact with the left side of the first right pad 90R'.

For example, the left end of the first lower pad 90D' may be adjacent to or in contact with the right side of the first left pad 90L', and the right end of the first lower pad 90D' may be adjacent to or in contact with the left side of the first right pad 90R'.

That is, the first upper pad 90U' and the first lower pad 90D' may meet the first left pad 90L' and the first right pad 90R' to form corners.

Referring again to FIGS. 28 and 32, the light source 34, 34' may provide light to the light absorbing layer 50 and the optical sheet 40 through the light guide plate 38 or the diffusion plate 39. Light passing through the light absorbing layer 50 and the optical sheet 40 may be provided to the display panel 10. The display panel 10 may display an image using this light.

In addition, the light provided by the light source 34, 34' may be divided into light not yet passing through the light absorbing layer 50 and light having passed through the light absorbing layer 50, with each light having a different spectra.

Referring again to FIG. 15, part of the light L1 of the optical assembly 34, 34' may pass through the first light absorbing layer 50a and the second light absorbing layer 50b without being absorbed or reflected by the green phosphor GP and the red phosphor RP and appear as blue (B)-based light, and this blue (B)-based light may then be mixed with the green (G)-based light emitted from the first light absorbing layer 50a and the red (R)-based light emitted from the second light absorbing layer 50b, thereby realizing white light L3.

This optical conversion may be repeated by recycling between the reflective sheet (denoted by 36 in FIGS. 9 and 10, and 37 denoted by 37 in FIGS. 11 and 12) and the optical sheet 40. However, an optical conversion rate at a location adjacent to an edge of the light absorbing layer 50 may be smaller than an optical conversion rate at a location adjacent to the center of the light absorbing layer 50. For example, the optical assembly 34, 34' may emit blue-based light. That is, near the edge of the light absorbing layer 50, blue-based light with a strong radiant flux may be provided toward the display panel 10. In addition, near the edge of the light absorbing layer 50, blue-based light with a strong radiant flux may be provided toward the display panel 10 through a gap between the horizontal portion 13H and the optical sheet 40.

In this case, the fluorescent layer 901 (see FIG. 30) of the first pad 90 and the second pad 91 may each include yellow phosphor (see FIGS. 28 and 29). The fluorescent layer 901' (see FIG. 34) of the first pad 90' may each include yellow phosphor (see FIGS. 32 and 33). For example, the yellow phosphor may be YAG (Yttrium Aluminum Garnet), La3Si6N11, LuAG (A15Lu3O12), or a silicate.

That is, near an edge of the light absorbing layer 50, light of the optical assembly 34, 34' may be absorbed or reflected by the yellow phosphor of the fluorescent layer 901 and 901', exciting the yellow phosphor, and the yellow phosphor may emit yellow-based light. This yellow-based light may be mixed with the blue-based light from the optical assembly 34, 34', which has passed through the pad 90, 91, 90', without being absorbed or reflected by the yellow phosphors, thereby realizing white light.

Alternatively, the fluorescent layer 901, 901' may include both the yellow phosphor and the red phosphor, and the light from the optical assembly 34, 34', 34c, which has passed through the phosphor layer 901, 901', may be realized as white light. For example, the yellow phosphor may be YAG (Yttrium Aluminum Garnet), La3Si6N11, LuAG (A15Lu3O12), or a silicate. For example, the red phosphor may be (Sr, Ca) AlSiN3:Eu or (Sr, Ca, Ba)2SiN8:Eu.

Accordingly, the pad 90, 91, 90' may minimize the formation of a blue band near the edge of the display panel 10.

Referring again to FIG. 22, the blue-based light from the light source 34, 34' may be absorbed or reflected by the phosphors YP, AP, exciting the phosphors YP, AP, and the phosphors YP, AP may emit yellow-based light and/or red-based light. The light L1' (especially the blue-based light), emitted as blue-based light from the light sources 34, 34' and passing through the phosphor 34c and the encapsulant 34b, may pass through the first light absorbing layer 50a', where the light l' is absorbed or reflected by the green phosphor GP, exciting the green phosphor GP, and the green phosphor GP may emit green-based light. The green (G)-based light L0' emitted from the green phosphor GP in the first light absorbing layer 50a' may pass through the second light absorbing layer 50b, where the light L0' is absorbed or reflected by the red phosphor RP, exciting the red phosphor RP, and the red phosphor RP may emit red-based light. Accordingly, the light L2' passing through the low-concentration light absorbing layer 50' may realize white light.

This optical conversion may be repeated by recycling between the reflective sheet (denoted by 36 in FIGS. 9 and 10, and 37 denoted by 37 in FIGS. 11 and 12) and the optical sheet 40. However, an optical conversion rate at a location adjacent to the edge of the light absorbing layer 50' may be smaller than an optical conversion rate at a location adjacent to the center of the light absorbing layer 50'. That is, near the edge of the light absorbing layer 50', blue-based light with a strong radiant flux may be provided toward the display panel 10. In addition, near the edge of the light absorbing layer 50', blue-based light with a strong radiant flux may be provided toward the display panel 10 through a gap between the horizontal portion 13H and the optical sheet 40.

In this case, the fluorescent layer 901 (see FIG. 30) of the first pad 90 and the second pad 91 may each include yellow phosphor (see FIGS. 28 and 29). The fluorescent layer 901' (see FIG. 34) of the first pad 90' may each include yellow phosphor (see FIGS. 32 and 33). For example, the yellow phosphor may be YAG (Yttrium Aluminum Garnet), La3Si6N11, LuAG (A15Lu3O12), or a silicate.

That is, near the edge of the light absorbing layer 50', the light from the optical assembly 34, 34', 34c may be absorbed or reflected by the yellow phosphor of the fluorescent layer 901, 901', exciting the yellow phosphor, and the yellow phosphor may emit yellow-based light. This yellow-based light may be mixed with the blue-based light from the optical assembly 34, 34', 34c, which has passed through the pad 90, 91, 90', without being absorbed or reflected by the yellow phosphor, thereby realizing white light.

Alternatively, the fluorescent layers 901, 901' may include yellow phosphor and red phosphor, and the optical assembly 34, 34', 34c, which has passed through the fluorescent layer 901, 901', may be realized as white light. For example, the yellow phosphor may be YAG (Yttrium Aluminum Garnet), La3Si6N11, LuAG (A15Lu3O12), or a silicate. For example, the red phosphor may be (Sr, Ca) AlSiN3:Eu or (Sr, Ca, Ba)2SiN8:Eu.

Accordingly, the pad 90, 91, 90' may minimize the formation of a blue band near the edge of the display panel 10.

Referring to FIGS. 36 and 37, a light absorbing layer 50", 50" may be located between a light source 34, 34' and a display panel 10. A light absorbing layer 50" (see FIG. 36) may include red phosphor RP. Alternatively, the light absorbing layer 50" (see FIG. 37) may include a first light absorbing layer 50a" provided with red phosphor RP, and a second light absorbing layer 50b provided with red phosphor RP. The first light absorbing layer 50a" may be a QD film (Quantum Dot Enhancement Film). The second light absorbing layer 50b may be a NOM film (Nano Organic Material Film). For example, the red phosphor RP may be particles of less than 1 micrometer ((Sr,Ca) AlSiN3:Eu).

The light absorbing layer 50", 50' may absorb green-based light and emit red-based light. For example, the light absorbing layer 50", 50" may absorb light in a wavelength range of 500 to 600 nm. For example, the light absorbing layer 50", 50" may absorb light in a wavelength range of 524 to 557 nm.

Phosphor 34c' may be located around the light source 34, 34'. For example, the phosphor 34c' may be in powder form. The light source 34, 34' and the phosphor 34c' may be collectively referred to as an optical assembly 34, 34', 34c'.

For example, an encapsulant 34b may be provided with the phosphor 34c' and cover the light source 34, 34'. The liquid encapsulant 34b mixed with the phosphor 34c' may cover the light source 34, 34' and be hardened.

In another example, a housing 34a may provide a concave space where the light source 34, 34' is located. The encapsulant 34b may be provided with the phosphor 34c'. The liquid encapsulant 34b mixed with the phosphor 34c' may fill the space of the housing 34a and be hardened, and may cover the light source 34, 34'.

The light from the light source 34, 34' may be blue-based light. For example, the light source 34, 34' may be a blue LED. The phosphor 34c' may include green phosphor GP. For example, the green phosphor GP may be SrGa2S4:Eu or β-SiAlon.

Accordingly, the blue-based light from the light sources 34, 34' may be absorbed or reflected by the green phosphor GP, exciting the green phosphor GP, and the green phosphor GP may emit green-based light.

Light L1" (especially, green-based light) emitted as blue (B)-based light from the light source 34, 34' and passing through the green phosphor GP and the encapsulant 34b may pass through the light absorbing layers 50" and 50", where the light L1" is absorbed or reflected by the red phosphor RP, exciting the red phosphor RP, and the red phosphor RP may emit red-based light. This optical conversion may be repeated by recycling between the reflective sheet (denoted by 36 in FIGS. 9 and 10, and 37 denoted by 37 in FIGS. 11 and 12) and the optical sheet 40.

In this case, part of the light from the light source 34, 34' may pass through the light absorbing layer 50", 50" without being absorbed or reflected by the green phosphor GP and red phosphor RP and appear as blue-based light, and this blue-based light may be mixed with green-based light and red-based light, which are emitted from green phosphor GP and red phosphor RP, thereby realizing white light L3", L3".

This optical conversion may be repeated by recycling between the reflective sheet (denoted by 36 in FIGS. 9 and 10, and 37 denoted by 37 in FIGS. 11 and 12) and the optical sheet 40. However, an optical conversion rate at a location adjacent to an edge of the light absorbing layer 50", 50" may be smaller than an optical conversion rate at a location adjacent to the center of the light absorbing layer 50", 50". That is, near the edge of the light absorbing layer 50", 50", cyan-based light with a strong radiant flux from the optical assembly 34, 34', 34c' may be provided toward the display panel 10. Additionally, near the edge of the light absorbing layer 50", 50", cyan-based light with a strong radiant flux from the optical assembly 34, 34', 34c' may be provided toward the display panel 10 through a gap between the horizontal portion 13H and the optical sheet 40.

In this case, each fluorescent layer 901 (see FIG. 30) of a first pad 90 and a second pad 91 may include red phosphor (see FIGS. 28 and 29). The fluorescent layer 901' (see FIG. 34) of the first pad 90' may include red phosphor (see FIGS. 32 and 33). For example, the red phosphor may be (Sr, Ca) AlSiN3:Eu or (Sr, Ca, Ba)2SiN8:Eu.

That is, near the edge of the light absorbing layer 50", 50"', the light of the optical assembly 34, 34', 34c' may be absorbed or reflected by the red phosphor of the fluorescent layers 901 and 901', exciting the red phosphor, and the red phosphor may emit red-based light. This red-based light may be mixed with the cyan-based light from the optical assembly 34, 34', 34c', which has passed through the pad 90, 91, 90', without being absorbed or reflected by the red phosphor, thereby realizing white light.

Accordingly, the pad 90, 91, 90' may minimize the formation of a cyan band near the edge of the display panel 10.

Meanwhile, unlike the above description, the light absorbing layer 50", 50"' may include green phosphor GP instead of the red phosphor RP, and the phosphor 34c' may include red phosphor RP instead of the green phosphor GP. For example, the green phosphor GP may be particles of 3 to 7 micrometer particles (SrGa2S4:Eu). For example, the red phosphor AP may be (Sr, Ca) AlSiN3:Eu or (Sr, Ca, Ba)2SiN8:Eu. The blue-based light from the light source 34, 34' may be absorbed or reflected by the red phosphor RP, exciting the red phosphor RP, and the red phosphor RP may emit red-based light. The light L1" (especially, red-based light) emitted as blue (B)-based light from the light source 34, 34' and passing through the red phosphor RP and the encapsulant 34b may pass through the light absorbing layer 50", 50"', where the light L1 is absorbed or reflected by the green phosphor GP, thereby exciting the green phosphor GP, and the green phosphor GP may emit green-based light. This optical conversion may be repeated by recycling between the reflective sheet (denoted by 36 in FIGS. 9 and 10, and 37 denoted by 37 in FIGS. 11 and 12) and the optical sheet 40.

In this case, part of the light from the light source 34, 34' may pass through the light absorbing layer 50", 50"', without being absorbed or reflected by the red phosphor RP and green phosphor GP, and appear as blue-based light, and this blue-based light may then be mixed with red-based light and green-based light, which are emitted from red phosphor RP and green phosphor GP, thereby realizing white light L3", L3"'.

This optical conversion may be repeated by recycling between the reflective sheet (denoted by 36 in FIGS. 9 and 10, and 37 denoted by 37 in FIGS. 11 and 12) and the optical sheet 40. However, an optical conversion rate at a location adjacent to an edge of the light absorbing layer 50", 50"' may be smaller than an optical conversion rate at a location adjacent to the center of the light absorbing layer 50", 50"'. That is, near the edge of the light absorbing layers 50" and 50"', purple-based light with a strong radiant flux from the optical assembly 34, 34', 34c may be provided toward the display panel 10. Additionally, near the edge of the light absorbing layer 50", 50"', purple-based light with a strong radiant flux from the optical assembly 34, 34', 34c may be provided toward the display panel 10 through a gap between the horizontal portion 13H and the optical sheet 40.

In this case, each fluorescent layer 901 (see FIG. 30) of the first pad 90 and the second pad 91 may include green phosphor (see FIGS. 28 and 29). The fluorescent layer 901' (see FIG. 34) of the first pad 90' may include green phosphor (see FIGS. 32 and 33). For example, the green phosphor GP may be SrGa2S4:Eu or β-SiAlon.

That is, near the edge of the light absorbing layer 50", 50"', the light from the optical assembly 34, 34', 34c may be absorbed or reflected by the green phosphor of the fluorescent layer 901, 901', exciting the green phosphor, and the green phosphor may emit green-based light. This green-based light may be mixed with the purple-based light from the optical assembly 34, 34', 34c, which has passed through the pad 90, 91, 90', without being absorbed or reflected by the green phosphor, thereby realizing white light L3".

Accordingly, the pad 90, 91, 90' may minimize the formation of a purple band near the edge of the display panel 10.

Referring to FIGS. 1 to 37, a display device according to one aspect of the present disclosure may include: a display panel; an optical assembly which provides light to the display panel; a light absorbing layer located on an optical path from the optical assembly to the display panel, and which absorbs light within a certain wavelength range; an optical plate opposite to the display panel with respect to the light absorbing layer; and a first pad located at a front surface of the light absorbing layer adjacent to an edge of the light absorbing layer and including a fluorescent layer, wherein white light may be incident on the display panel.

The light absorbing layer may include phosphor, and a color of light emitted by the phosphor and the fluorescent layer may be complementary to a color of light emitted by the optical assembly.

The optical assembly may include a light source providing blue-based light, and the fluorescent layer may have yellow phosphor.

The optical assembly may further include yellow phosphor located around the light source, and the light absorbing layer may include green phosphor and red phosphor.

The optical assembly may include: a light source providing blue-based light; and green phosphor located around the light source, and the fluorescent layer may have red phosphor.

The light absorbing layer may include red phosphor.

The optical assembly may include: a light source providing blue-based light; and red phosphor located around the light source, and the fluorescent layer may have green phosphor.

The light absorbing layer may include green phosphor.

The first pad may include: a first upper pad adjacent to an upper side of the light absorbing layer and extending along the upper side of the light absorbing layer; a first lower pad adjacent to a lower side of the light absorbing layer and extending along the lower side of the light absorbing layer; a first left pad adjacent to a left side of the light absorbing layer and extending along the left side of the light absorbing layer; and a first right pad adjacent to a right side of the light absorbing layer and extending along the right side of the light absorbing layer.

The optical plate may include a first side and a second side opposite to the first side; the optical assembly may include a light source providing light to the first side of the optical plate; the light absorbing layer may be offset from the first side to the second side of the optical plate; and the display device may further include a second pad located on a front surface of the optical plate adjacent to the first side and provided with a fluorescent layer, wherein a color of light emitted by the fluorescent layer of the second pad may be substantially identical to a color of light emitted by the fluorescent layer of the first pad.

The light absorbing layer may include green phosphor and red phosphor, and the optical assembly may include: a light source providing blue-based light; and yellow and red phosphor located around the light source, wherein a color temperature of an image provided on the front surface of the display panel may be between 8,000 and 12,000K.

The optical assembly may further include an encapsulant covering the light source and having the phosphor of the optical assembly, wherein a content of the phosphor in the encapsulant may be between 5 and 10%.

The light absorbing layer may include: a first light absorbing layer including the green phosphor of the light absorbing layer; and a second light absorbing layer including the red phosphor of the light absorbing layer and located on the first light absorbing layer.

The green phosphor in the first light absorbing layer may include particles of 3 to 7 micrometers, and the red phosphor in the second light absorbing layer may contain particles of 1 micrometer or less.

Light provided to the display panel through the light absorption layer may have green light with a radiant flux of 35 to 40% and red light with a radiant flux of 21 to 28%, based on a radiant flux (100%) of blue light, and a peak wavelength of the blue light may be between 443 and 450 nm, a peak wavelength of green light may be between 530 and 550 nm, and a peak wavelength of the red light may be between 610 and 630 nm.

According to another aspect of the present disclosure, a display device may include: a display panel; an optical assembly providing light to the display panel; a light absorbing layer located on an optical path provided from the optical assembly to the display panel and absorbing light of a certain range of wavelengths; an optical plate opposite to the display panel with respect to the light absorbing layer; a guide panel extending along a periphery of the optical plate, the guide panel including a vertical portion covering the periphery of the optical plate and a horizontal portion extending between the display panel and the light absorbing layer from the vertical portion; and a first pad located between the horizontal portion and the light absorbing layer, coupled to the horizontal portion, and adjacent to or in contact with a front surface of the light absorbing layer, wherein the first pad may include a fluorescent layer having a phosphor.

The first pad may be adjacent to an edge of the light absorbing layer.

The optical assembly may include a light source providing blue-based light, and the fluorescent layer may have yellow phosphor.

The optical assembly may include a light source providing blue-based light, and the fluorescent layer may include yellow phosphor and red phosphor.

The first pad may include: a first upper pad adjacent to an upper side of the absorption layer and extending along the upper side of the absorption layer; a first lower pad adjacent to a lower side of the absorption layer and extending along the lower side of the absorption layer; a first left pad adjacent to a left side of the absorption layer and extending along the left side of the absorption layer; and a first right pad adjacent to a right side of the absorption layer and extending along the right side of the absorption layer.

The first upper pad and the first lower pad may meet the first left pad and the first right pad to form corners.

The optical plate may include a first side and a second side opposite the first side; the optical assembly may include: a light source providing light to the first side of the optical plate; the absorption layer may be offset from the first side toward the second side of the optical plate; the display device may further include a second pad which is located adjacent to the first side and between the horizontal portion and the optical plate, coupled to the horizontal portion, and adjacent to or in contact with the front surface of the optical plate; and the second pad may include a fluorescent layer having phosphor.

The phosphor in the fluorescent layer of the second pad may be identical to the phosphor in the fluorescent layer of the first pad.

The first side may be a lower side of the optical plate; the first pad may further include a first lower pad adjacent to a lower side of the absorption layer and extending along the lower side of the absorption layer; and the second pad may be located between the lower side of the absorption layer and the lower edge of the optical plate and may be disposed parallel to the first lower side pad.

The horizontal portion may further include a guide rib protruding between the first lower pad and the second pad from the horizontal portion.

The first pad may further include a plurality of layers disposed in front of and behind the fluorescent layer.

The display device may include: a frame located at the rear of the optical plate; a reflective sheet located between the optical plate and the frame; and an optical sheet located between the absorption layer and the display panel, and the first pad may be located on the optical sheet.

The optical assembly may include a light source providing blue-based light, and the absorption layer may include: a first light absorbing layer including green phosphor; and a second light absorbing layer including red phosphor and adhered to the first light absorbing layer.

The optical assembly may include: an encapsulant covering the light source; and phosphor located inside the encapsulant, and the phosphor in the optical assembly may include yellow phosphor and red phosphor.

A content of the phosphor of the optical assembly relative to the encapsulant may be 5 to 10%, and a color temperature of an image provided at a front surface of the display panel may be 8,000 to 12,000 K.

According to another aspect of the present disclosure, a display device may include: a display panel; an optical assembly providing light to the display panel; a light absorbing layer located on an optical path provided from the optical assembly to the display panel and absorbing light of a certain range of wavelengths, and the light absorbing layer may include green phosphor and red phosphor, the optical assembly may include: a light source providing blue-based light; an encapsulant covering the light source; and a phosphor located inside the encapsulant, and a color temperature of a image provided by a front of the display panel may be 8,000 to 12,000K.

The phosphor of the optical assembly may include yellow phosphor and red phosphor.

A content of the phosphor of the optical assembly relative to the encapsulant may be 5 to 10%.

The light absorbing layer may include: a first light absorbing layer located between the optical assembly and the display panel and including the green phosphor; and a second light absorbing layer located between the first absorption layer and the display panel and including the red phosphor.

The green phosphor of the first light absorbing layer may include particles of 3 to 7 micrometers, and the red phosphor of the second light absorbing layer may contain particles of 1 micrometer or less.

The first light absorbing layer may be thicker than the second light absorbing layer, and the second light absorbing layer may be adhered to the first light absorbing layer.

Light provided to the display panel through the light absorbing layer may have green-based light with a radiant flux of 20 to 70% and red-based light with a radiant flux of 20 to 70%, based on a radiant flux (100%) of blue-based light.

Light provided to the display panel through the light absorbing layer may have green-based light with a radiant flux of 35 to 40% and red-based light with a radiant flux of 21 to 28%, based on a radiant flux (100%) of blue-based light.

A peak wavelength of the blue light may be between 443 and 450 nm, a peak wavelength of the green light may be between 530 and 550 nm, and a peak wavelength of the red light may be between 610 and 630 nm.

The display device may includes: a frame on which the optical assembly is mounted; and an optical sheet located between the optical assembly and the display panel and opposite the optical assembly, and the light absorbing layer may be located at one surface of the optical sheet.

The display device may include: a frame on which the optical assembly is mounted; a light guide plate coupled to the frame; and an optical sheet located between the light guide plate and the display panel and opposite the light guide plate, and the optical assembly may be adjacent to a perimeter of the light guide plate and mounted on the frame, and the absorption layer may be located at one surface of the light guide plate.

The embodiments of the present disclosure described above or other embodiments are not mutually exclusive or distinct. Each of the described embodiments or other embodiments may combine or incorporate different configurations or functions.

For example, this means that the A configuration described in one embodiment and/or drawing can be combined with the B configuration described in another embodiment and/or drawing. In other words, unless specifically stated otherwise, combinations are possible unless it is described that combinations are not possible.

The detailed description above should not be interpreted as limiting in any respect but should be considered illustrative. The scope of the present disclosure should be determined by the reasonable interpretation of the appended claims, and any modifications within the equivalent scope of the invention are included in the scope of the present disclosure.

What is claimed is:

1. A display device comprising:
   a display panel;
   an optical assembly providing light to the display panel;
   a light absorbing layer located on an optical path of light provided from the optical assembly to the display panel and absorbing light of a certain range of wavelengths;
   an optical plate opposite the display panel with respect to the light absorbing layer; and
   a first pad located at a front surface of the light absorbing layer adjacent to an edge of the light absorbing layer, and including a fluorescent layer,
   wherein white light is incident on the display panel,
   wherein the light absorbing layer comprises phosphor, and
   wherein a color of light emitted by the phosphor and the fluorescent layer is complementary to a color of light emitted from the optical assembly;
   wherein the display device further comprises:
     a substrate extending along a lateral side of the optical plate; and
     a guard positioned on the substrate and facing the lateral side of the optical plate,
   wherein the optical assembly comprises a plurality of optical assemblies positioned on the substrate, facing the lateral side of the optical plate, and arranged along a longitudinal direction of the substrate,
   wherein the guard comprises a plurality of slots which are spaced apart from each other in the longitudinal direction of the substrate, and in which the plurality of optical assemblies are positioned,
   wherein a distance between a portion of the guard excluding the plurality of slots and the lateral side of the optical plate is smaller than a distance between the plurality of optical assemblies and the lateral side of the optical plate.

2. The display device of claim 1,
   wherein the optical assembly comprises a light source providing blue-based light, and
   wherein the fluorescent layer has yellow phosphor.

3. The display device of claim 2,
   wherein the optical assembly further comprises yellow phosphor located around the light source, and
   wherein the light absorbing layer includes green phosphor and red phosphor.

4. The display device of claim 1,
   wherein the optical assembly comprises:
   a light source providing blue-based light; and
   green phosphor located around the light source,
   wherein the fluorescent layer has red phosphor.

5. The display device of claim 4, wherein the light absorbing layer includes red phosphor.

6. The display device of claim 1,
   wherein the optical assembly comprises:
   a light source providing blue-based light; and,
   red phosphor located around the light source, and
   wherein the fluorescent layer has green phosphor.

7. The display device of claim 6, wherein the light absorbing layer includes green phosphor.

8. The display device of claim 1, wherein the first pad comprises:
   a first upper pad adjacent to an upper side of the light absorbing layer and extending along the upper side of the light absorbing layer;
   a first lower pad adjacent to a lower side of the light absorbing layer and extending along the lower side of the light absorbing layer;
   a first left pad adjacent to a left side of the light absorbing layer and extending along the left side of the light absorbing layer; and
   a first right pad adjacent to a right side of the light absorbing layer and extending along the right side of the light absorbing layer.

9. The display device of claim 1,
   wherein the optical plate comprises:
   a first side; and
   a second side opposite to the first side,
   wherein the optical assembly comprises a light source providing light to the first side of the optical plate,
   wherein the light absorbing layer is offset from the optical plate in a direction from the first side to the second side,
   wherein the display device further comprises a second pad located on a front surface of the optical plate adjacent to the first side, and provided with a fluorescent layer, and
   wherein a color of light emitted by the fluorescent layer of the second pad is substantially identical to a color of light emitted by the fluorescent layer of the first pad.

10. The display device of claim 1,
wherein the light absorbing layer includes green phosphor and red phosphor,
wherein the optical assembly comprises:
a light source providing blue-based light; and
yellow phosphor and red phosphor located around the light source,
wherein a color temperature of an image provided by the front of the display panel is 8,000 to 12,000K.

11. The display device of claim 10,
wherein the optical assembly further comprises an encapsulant covering the light source and having the phosphor of the optical assembly, and
wherein a content of the phosphor of the optical assembly relative to the encapsulant is 5 to 10%.

12. The display device of claim 10, wherein the light absorbing layer further comprises:
a first light absorbing layer including the green phosphor of the light absorbing layer; and
a second light absorbing layer including the red phosphor of the light absorbing layer and located on the first light absorbing layer.

13. The display device of claim 12,
wherein the green phosphor of the first light absorbing layer comprises particles of 3 to 7 micrometers, and
wherein the red phosphor of the second light absorbing layer comprises particles less than 1 micrometer.

14. The display device of claim 12,
wherein light provided to the display panel through the light absorbing layer has green-based light with a radiant flux of 35 to 40% and red-based light with a radiant flux of 21 to 28%, based on a radiant flux (100%) of blue-based light,
wherein a peak wavelength of the blue-based light is 443 to 450 nm, a peak wavelength of the green-based light is 530 to 550 nm, and a peak wavelength of the red-based light is 610 to 630 nm.

* * * * *